United States Patent [19]

Mita et al.

[11] Patent Number: 5,231,677
[45] Date of Patent: Jul. 27, 1993

[54] IMAGE PROCESSING METHOD AND APPARATUS

[75] Inventors: Yoshinobu Mita, Kawasaki; Naoto Kawamura, Yokohama; Yuji Nishigaki; Katsuhito Dei, both of Tokyo, all of Japan

[73] Assignee: Canon Kabushiki Kaisha, Tokyo, Japan

[21] Appl. No.: 657,949

[22] Filed: Feb. 21, 1991

Related U.S. Application Data

[63] Continuation of Ser. No. 279,276, Dec. 2, 1988, abandoned, which is a continuation of Ser. No. 813,525, Dec. 26, 1985, abandoned.

[30] Foreign Application Priority Data

| Dec. 28, 1984 | [JP] | Japan | 59-276478 |
|---|---|---|---|
| Dec. 28, 1984 | [JP] | Japan | 59-276479 |
| Dec. 28, 1984 | [JP] | Japan | 59-276480 |
| Dec. 28, 1984 | [JP] | Japan | 59-276481 |
| Dec. 28, 1984 | [JP] | Japan | 59-276482 |
| Dec. 28, 1984 | [JP] | Japan | 59-276483 |
| Dec. 28, 1984 | [JP] | Japan | 59-276484 |
| Dec. 28, 1984 | [JP] | Japan | 59-276485 |
| Dec. 28, 1984 | [JP] | Japan | 59-276486 |
| Dec. 28, 1984 | [JP] | Japan | 59-276487 |
| Dec. 28, 1984 | [JP] | Japan | 59-276488 |

[51] Int. Cl.$^5$ .............................. G06K 9/48
[52] U.S. Cl. ................. 382/22; 358/183; 358/447; 358/462; 382/54
[58] Field of Search ........... 382/9, 22, 54; 358/183, 358/447, 455, 456, 457, 458, 462, 464, 452

[56] References Cited

U.S. PATENT DOCUMENTS

| 4,194,221 | 3/1980 | Stoffel | 358/283 |
|---|---|---|---|
| 4,259,694 | 3/1981 | Liad | 358/283 |
| 4,288,821 | 9/1981 | Lavallee et al. | 358/283 |
| 4,355,407 | 6/1982 | Atojiet et al. | 358/284 |
| 4,499,493 | 2/1985 | Nishimura | 358/282 |
| 4,503,461 | 3/1985 | Nishimura | 358/282 |
| 4,577,235 | 3/1986 | Kannapell et al. | 358/282 |
| 4,581,762 | 4/1986 | Lapidus et al. | 382/22 |
| 4,616,262 | 10/1986 | Toriumi et al. | 358/183 |
| 4,618,990 | 10/1986 | Sieb, Jr. et al. | 382/22 |
| 4,638,369 | 1/1987 | Hsieh | 382/22 |

FOREIGN PATENT DOCUMENTS

| 2826755 | 12/1979 | Fed. Rep. of Germany. |
| 3242734 | 5/1983 | Fed. Rep. of Germany. |

OTHER PUBLICATIONS

Digitale Bildsignalverarbeitung, pp. 62-88, Wahl, 1984 (w/partial translation).
Erfassung u. Maschinelle Verabeitung von Bilddaten, pp. 42-69, Kazmierczak, et al., 1980 (w/partial translation).
"Methoden zur Bilverbesserung" in Bildmessung u. Luftbildwesen, Mar. 1976, pp. 53-61 (w/partial translation).

*Primary Examiner*—Joseph Mancuso
*Attorney, Agent, or Firm*—Fitzpatrick, Cella, Harper & Scinto

[57] ABSTRACT

There are image processing method and apparatus for use in digital copying apparatuses, facsimile apparatuses, etc. which handle an image signal. This apparatus comprises an edge detector to detect the edge portion of the image signal, a smoothing circuit to smooth the image signal, an edge emphasizer to emphasize the edge of the image signal, and a mixer to mix the output of the smoothing circuit and the output of the edge emphasizer. A mixture ratio of the output of the smoothing circuit and the output of the edge emphasizer is varied in response to the output of the edge detector. The edge detection of the edge detector is performed due to the linear differentiation. With this apparatus, the moire in the case of a mesh original image is removed and the characters and line drawings can be reproduced with a high degree of fidelity.

39 Claims, 30 Drawing Sheets

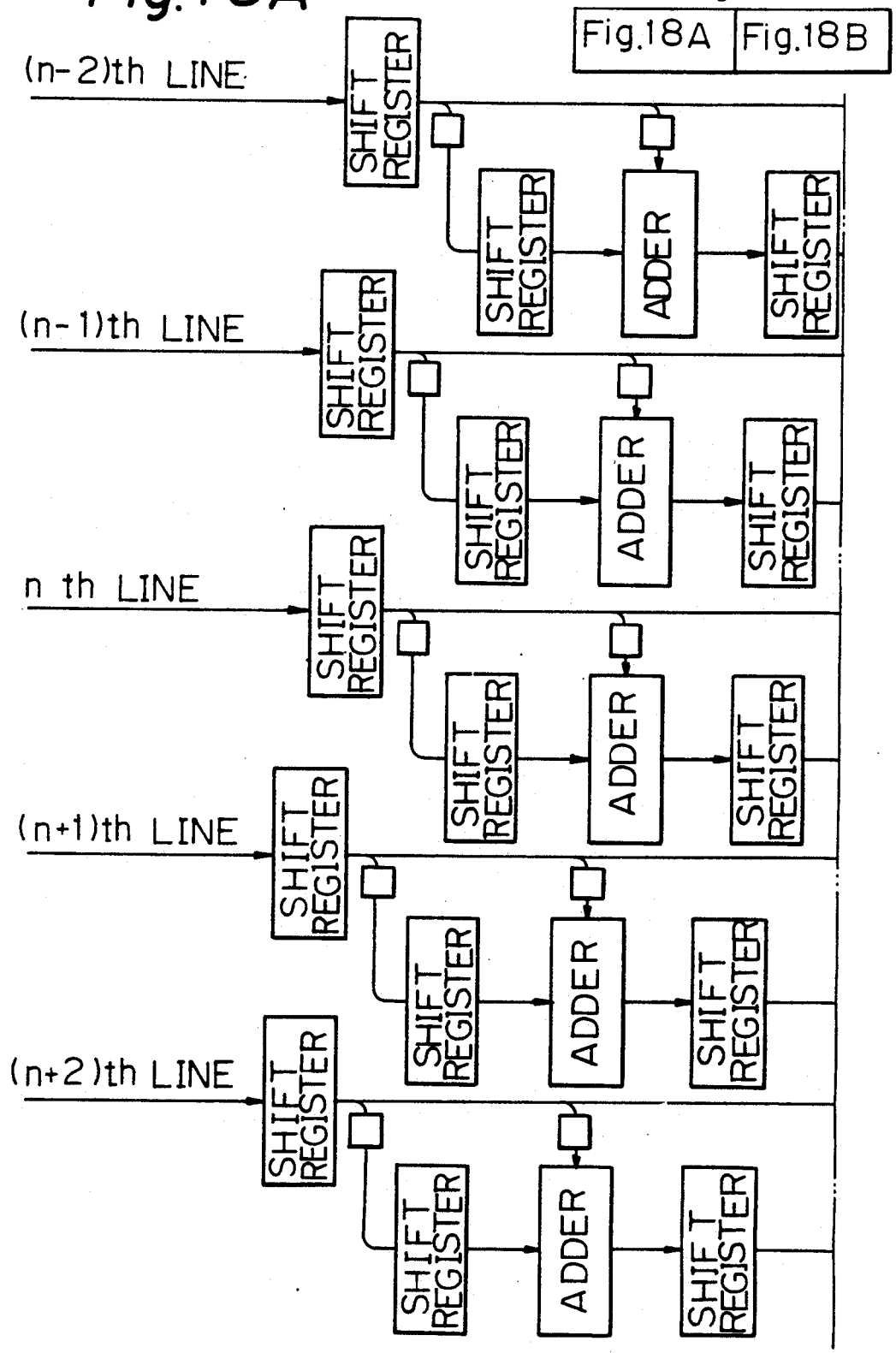

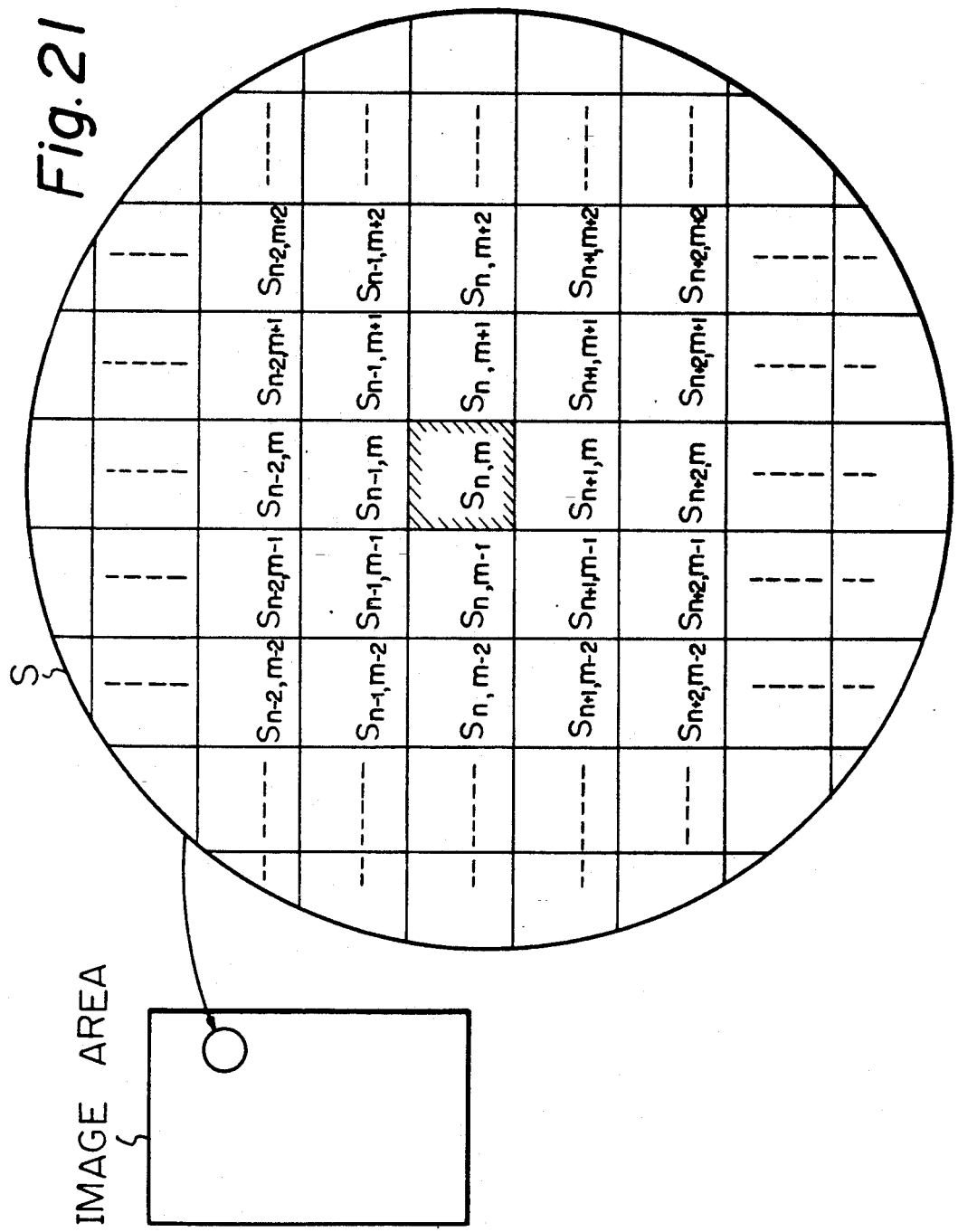

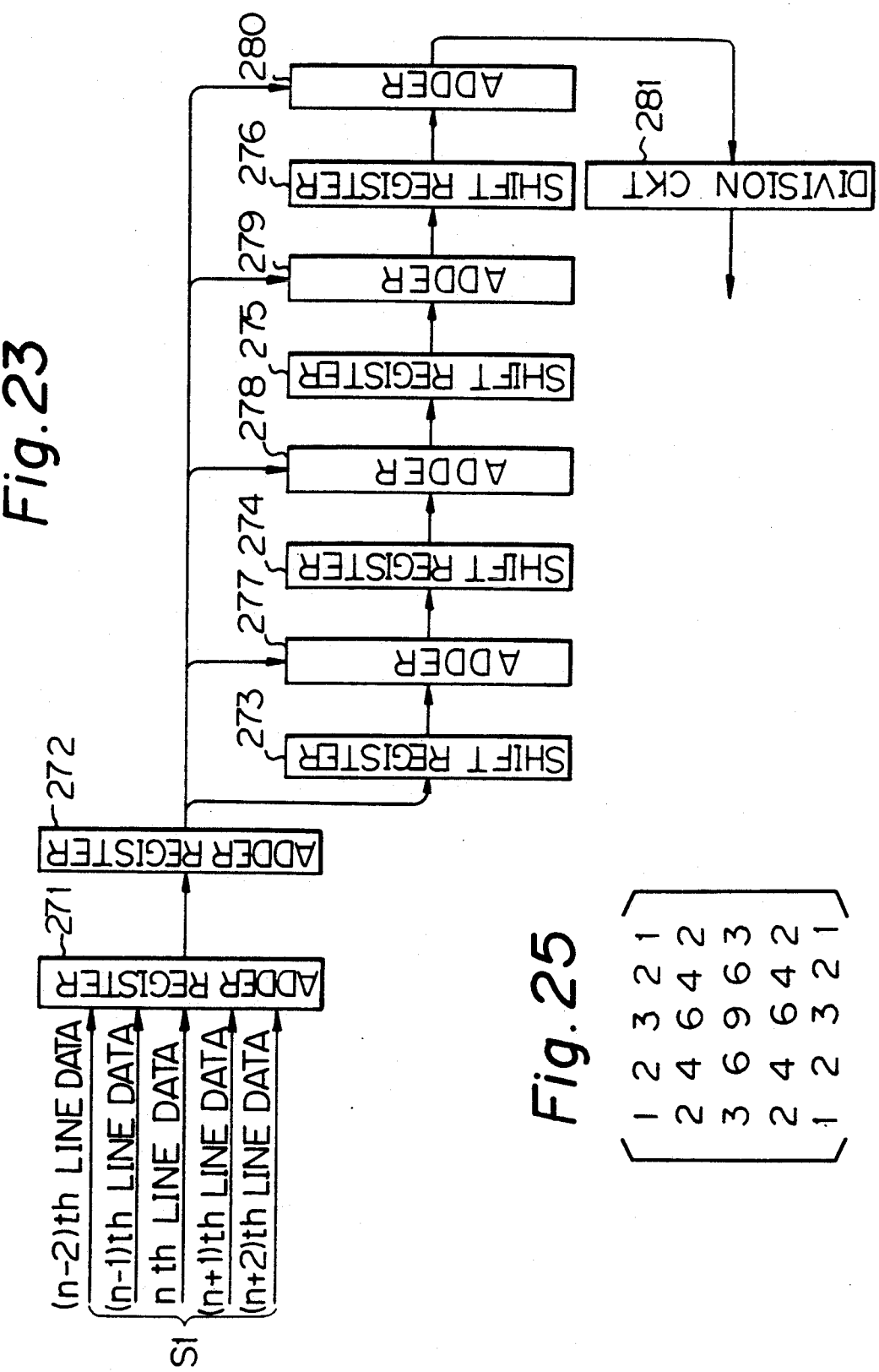

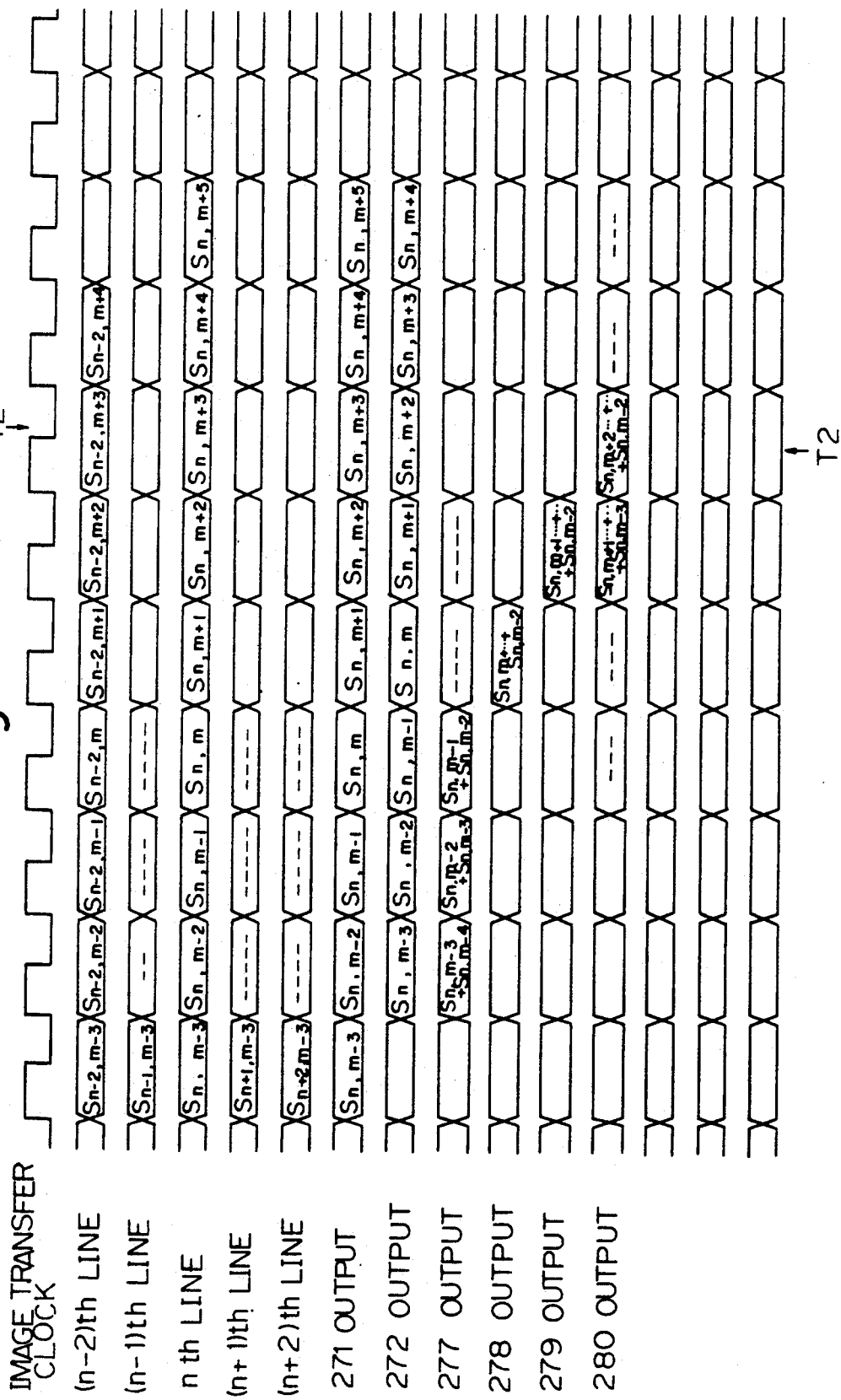

Fig. 28
$$\begin{matrix} n-2 \\ n-1 \\ n \\ n+1 \\ n+2 \end{matrix} \begin{pmatrix} 1 & 1 & 1 & 1 & 1 \\ 1 & 1 & 1 & 1 & 1 \\ 0 & 0 & 0 & 0 & 0 \\ -1 & -1 & -1 & -1 & -1 \\ -1 & -1 & -1 & -1 & -1 \end{pmatrix}$$
Fig. 29
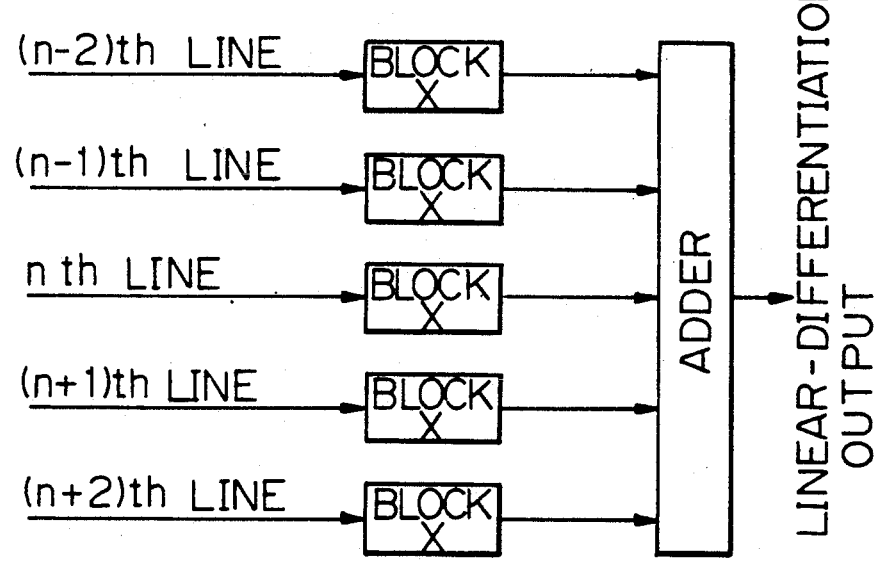
Fig. 30
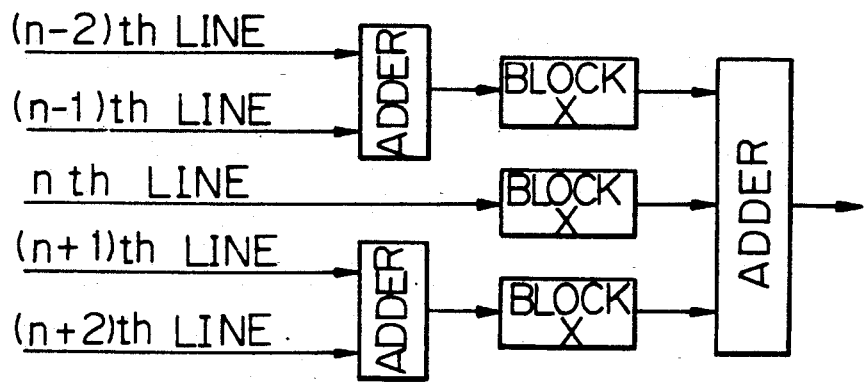

IMAGE PROCESSING METHOD AND APPARATUS

This application is a continuation of application Ser. No. 07/279,276, filed Dec. 2, 1988, which was a continuation of application Ser. No. 06/813,525, filed Dec. 26, 1985 now abandoned.

BACKGROUND OF THE INVENTION

1. Field of the Invention

The present invention relates to image processing method and apparatus for use in digital copying apparatuses, facsimile apparatuses, or the like which handle an image as an electrical signal.

2. Description of the Prior Art

There are what are called digital copying apparatuses in which, in general, an image is sampled by a CCD sensor or the like and the digitized data is outputted from a digital printer such as a laser beam printer or the like and thereby to reproduce an image. Such digital copying apparatuses are now widespread in place of conventional analog copying apparatuses owing to development of digital equipment. In such digital copying apparatuses, generally, gradation is reproduced by a dither method or a density pattern method to reproduce an image of a half tone. However, such methods have the following two large problems.

(1) In the case of an original of a mesh image, a periodic fringe pattern which does not exist on the original appears in the copied image.

(2) In the case of an original including line drawings, characters, or the like, the edge is cut at many positions due to the dither process, so that picture quality deteriorates.

The phenomenon of the above item (1) is called a moire phenomenon and it is considered that this phenomenon occurs due to the following causes (A), (B), and the like:

(A) Moire due to the mesh original and input sampling; and (B) Moire due to the mesh original and dither threshold matrix.

The moire phenomenon of type (A) is caused due to the occurrence of the beat frequency $$\Delta f = |f - nf_0| \; [PEL/mm] \quad (1)$$

This beat frequency $\Delta f$ consists of the high frequency $nf_0$ [PEL/mm] which is n times as large as the mesh frequency $f_0 (= 1/P_0)$ [PEL/mm] which is determined from the mesh pitch $P_0$ [mm] of the mesh original and the input sampling frequency $f_s (= 1/P_s)$ [PEL/mm]]- which is obtained from the input sensor pitch $P_s$ [mm].

On the other hand, when the threshold value of the dither is arranged as a dot concentration type such as a fatting type or the like, in general, the output image also has a pseudo-mesh structure, so that this causes beats between the input mesh original and the output image and the moire phenomenon of type (B) occurs. Assuming that the repetitive period pitch of the dither threshold value on the recording paper is $P_0$ [mm], the frequency becomes $F_D = 1/P_D$ [PEL/mm] and the beat frequency becomes $$\Delta f = |f_0 - f_D| \; [PEL/mm] \quad (2)$$

Between the above-mentioned two moire phenomena of types (A) and (B), the moire phenomenon of type (B) most strongly occurs. This is because according to the phenomenon of type (A), in general, the value of n of the n-time high frequency of the mesh original is about 3 to 6 and the transfer function (MTF) or the like of the optical system or the like to lead the light to a sensor decreases considerably at that frequency, so that the contrast of the moire fringe is also low.

The moire phenomena which occur due to the foregoing causes make the quality of output image deteriorate remarkably. Therefore, various measures and investigations have been carried out hitherto. For example, according to a random dither method, the moire can be removed but a sand-like and grain-like image appears, so that the picture quality deteriorates. Paul G. Roetling has proposed ARIES in J. Opt. Soc. Am., Vol. 66, No. 10, Oct. 1976, page 985. According to this ARIES, the mean values of the densities before and after binarization are compared and the threshold value is controlled in a feedback manner so that they become equal. However, according to this method, the hardware is complicated and an effect sufficient to remove the moire is not obtained.

On the other hand, the remeshing method is described in Takashima, et al., "Meshing of Mixture Image of Characters and Photographs", Institute of Image Electronics, thesis 83-3, page 13. According to this remeshing method, the mesh image is remeshed by a dither pattern by means of a scumbling process (or averaging process with the peripheral pixels), so that the moire is removed and the grain-like noise is reduced.

However, the scumbling process (or averaging process with the peripheral pixels) results in a decrease in resolution. In other words, if one intends to remove the moire, the resolution decreases and if one intends to keep the resolution, the moire is not removed. Therefore, it is inevitable to preliminarily extract only the mesh image area and apply the foregoing method only to this area. For this purpose, what is called an image area separating technology is needed. According to this image area separating technology, the foregoing method cannot be easily realized since it is difficult to obtain the high-accurate and high-speed method, particularly, the method suitable to implement in hardware at the present technical level. Even if the image area separating technology is obtained, the high frequency component in the image is also averaged and smoothed by such a method, so that this method is still insufficient.

On the other hand, with respect to the problem (2), the characters and line drawings of the original are finely divided due to the dither process and, in particular, the edge portion is cut at many positions, so that the printing quality deteriorates. This phenomenon is particularly remarkable in the case where the dither pattern is the dot concentration type such as the fatting type or the like mentioned above.

SUMMARY OF THE INVENTION

It is an object of the present invention to provide an image processing method and apparatus which can eliminate the foregoing drawbacks.

Another object of the invention is to provide an image processing method and apparatus which can derive a high-quality and high-precision image from an input image signal.

Still another object of the invention is to provide an image processing method and apparatus which can reproduce characters and line drawings with a high degree of fidelity by removing the moire phenomenon which occurs in the case of a mesh original and preserving the high-band (high-frequency) component of the input image.

Practically speaking, those objects are achieved, according to one aspect of the invention, by providing image processing method and apparatus which can execute the image process in accordance with the characteristic of an input image signal by selectively outputting either data obtained by smoothing the input image signal or data of which the input image signal is not smoothed in response to an edge detection output of the input image signal, or by outputting those smoothed data and non-smoothed data at the mixture ratio according to the edge detection output.

The above and other objects and features of the present invention will become apparent from the following detailed description and the appended claims with reference to the accompanying drawings.

BRIEF DESCRIPTION OF THE DRAWINGS

FIG. 21 is a diagram showing an image area;

FIG. 23 is a detailed block diagram of the smoothing processor 3;

FIG. 24 is a diagram showing the operation of the smoothing processor 3;

FIG. 25 is a diagram showing a kernel for another smoothing process;

FIG. 28 is a diagram showing a kernel of the linear differentiation;

FIG. 29 is a conventional convolution circuit diagram;

FIGS. 30 to 32 are convolution circuit diagrams of the embodiment;

DETAILED DESCRIPTION OF THE PREFERRED EMBODIMENTS

Fundamental Construction FIGS. 1 to 6

Figure 1:
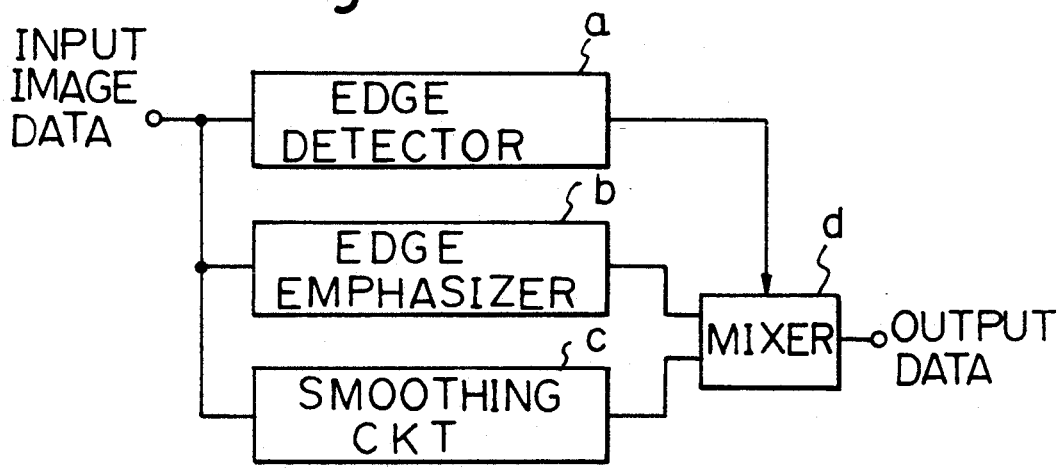
FIG. 1 is a fundamental block diagram of the first embodiment of the present invention.

A fundamental construction of an image processing apparatus of an embodiment of the present invention is shown in FIG. 1. This image processing apparatus comprises an edge detector a, an edge emphasizer b, a smoothing circuit c, and a mixer d. The edge detector a has the spatial frequency characteristic such that the edges of the characters, line drawings, and images are detected and the meshes of a mesh image are not detected as edges, as will be explained hereinafter. The edge emphasizer b outputs an edge emphasizing image signal of the original image or the image in which the original image and edges are mixed at a certain ratio. The smoothing circuit c smoothes the image. The mixer d changes the mixture ratio of the edge emphasizing image and the smoothing image in accordance with a signal of the edge detector and outputs the image data having the different, i.e., selected or adjusted mixture ratio. In this manner, the meshes of the mesh image are determined to be a non-edge area and the smoothing process is performed to average them, thereby preventing the occurrence of the moire. The edges of the characters, line drawings, and images are determined to be edge area and these edges are emphasized, thereby meshing the characters and preventing reduction in sharpness of the images. Further, since edge areas and non-edge areas are continuously connected, texture change at the boundary does not occur.

The principle of this embodiment will now be described from the viewpoint of the frequency characteristic. First, the number of screen lines of the mesh image of the original is 120 to 150 in the case of an ordinary black and white image and is 133 to 175 in the case of a color image. The moire is likely to occur when the screen angle is 0 to 45 degrees. The mesh pitch in the main scanning direction when the line is read is the maximum and the spatial frequency is low when the screen angle is 45°, while this mesh pitch is the minimum and the spatial frequency is high when the screen angle is 0°. The spatial frequencies when the screen angle is 0° and 45° are as shown in Table 1.

TABLE 1

| The number of screen lines | Spatial frequency | |
| --- | --- | --- |
| | 0° | 45° |
| 120 | 4.724 1/mm | 3.341 1/mm |
| 133 | 5.236 1/mm | 3.703 1/mm |
| 150 | 5.906 1/mm | 4.176 1/mm |
| 175 | 6.89 1/mm | 4.872 1/mm |

Figure 2:
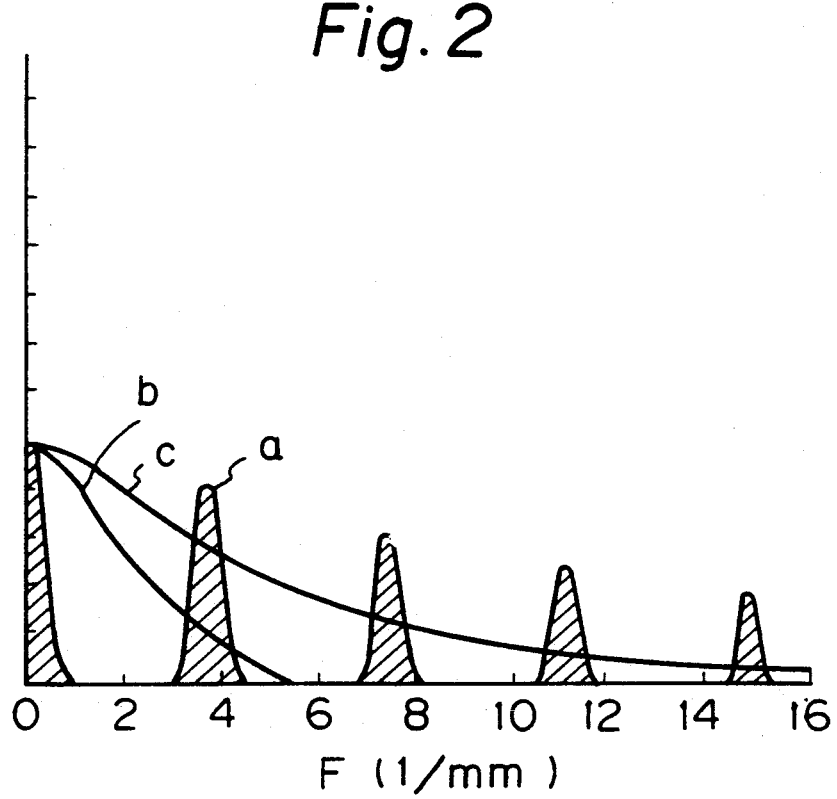
FIG. 2 is a diagram showing the frequency characteristics of various kinds of images.

As shown at a in FIG. 2, the frequency characteristic of such a mesh image has the peaks at the fundamental frequency and its high frequencies. On one hand, the frequency characteristics of the character image and continuous gradation photograph image are as shown in b and c in FIG. 2, respectively. With respect to such mixture images of the characters, photographs, and meshes, the spatial filters of the edge detector, edge emphasizer, and smoothing circuit of the embodiment form the frequency characteristics which satisfy the following conditions.

Condition 1

The peak frequency of the spatial filter of the edge detector is set to be lower than the primary harmonic frequency of the mesh image.

Condition 2

The peak frequency of the spatial filter of the edge emphasizer is set to be higher than the peak frequency of the spatial filter of the edge detector.

Condition 3

The frequency characteristic of the spatial filter of the smoothing circuit is sufficiently reduced near the primary harmonic frequency of the mesh image and is also sufficiently reduced near the frequency corresponding to the period of the dither of the output.

Although there are various kinds of spatial filters to detect the edges, assuming that the matrix size which influences the scale of the hardware circuit is set to be constant, the linear differentiation filter has the peak at a lower frequency than that of the quadratic differentiation filter. Although the quadratic differentiation filter has no orientation, the linear differentiation filter has an orientation and it is necessary to get the square root of the sum of the squares of the gradients in at least two directions, or as an approximate expression, the sum of the absolute values of the gradients in at least two directions or the maximum value of the absolute values of the gradients in at least two directions, or the like. In addition, the linear differentiation is stronger against dot-like noise than the quadratic differentiation. As mentioned above, it is desirable to use the linear differentiation filter as the spatial filter of the edge detector a.

On the contrary, as the spatial filter of the edge emphasizer b, the quadratic differentiation filter having no orientation and having the peak at a higher frequency is superior to the linear differentiation filter.

To know the relationships among the frequency characteristics of the above-explained various spatial filters, they were calculated by the one-dimensional high-speed Fourier transformation (FFT) for simplicity and the results are shown hereinafter. For example, the calculation is made with respect to the case of using the dither matrix of 4×4 in which the read sampling interval of the input system is 1/16 mm and that of the output system is 16 dots/mm. The period of the dither pattern is 4 (1/mm) in terms of the spatial frequency. In addition, in the case of the reading at the sampling interval of 1/16 mm, the frequency of up to 8 (1/mm) can be detected using a sampling theorem.

Figure 3:
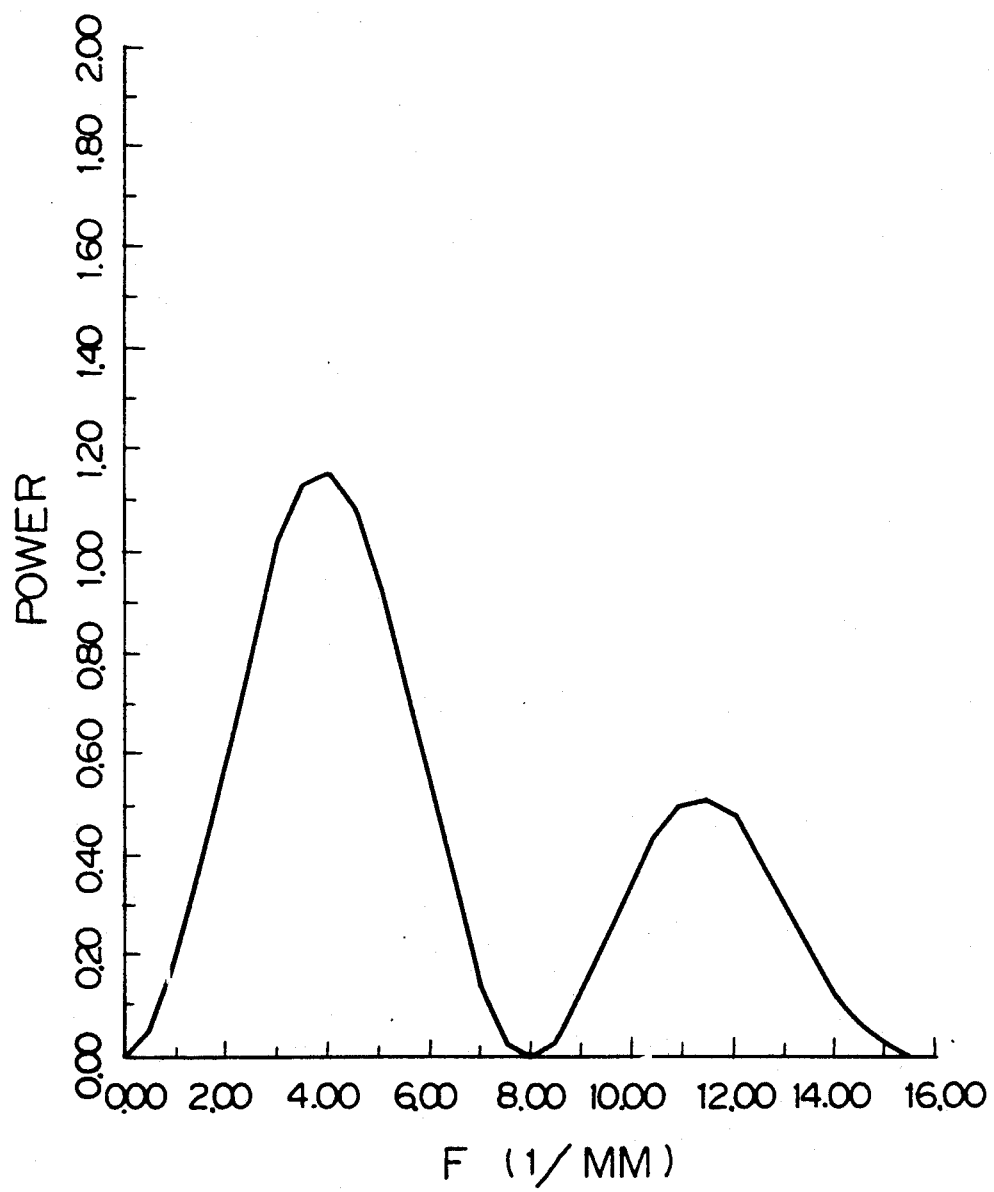
FIGS. 3 to 5 are frequency characteristic diagrams of various kinds of differentiating filters.
Figure 4:
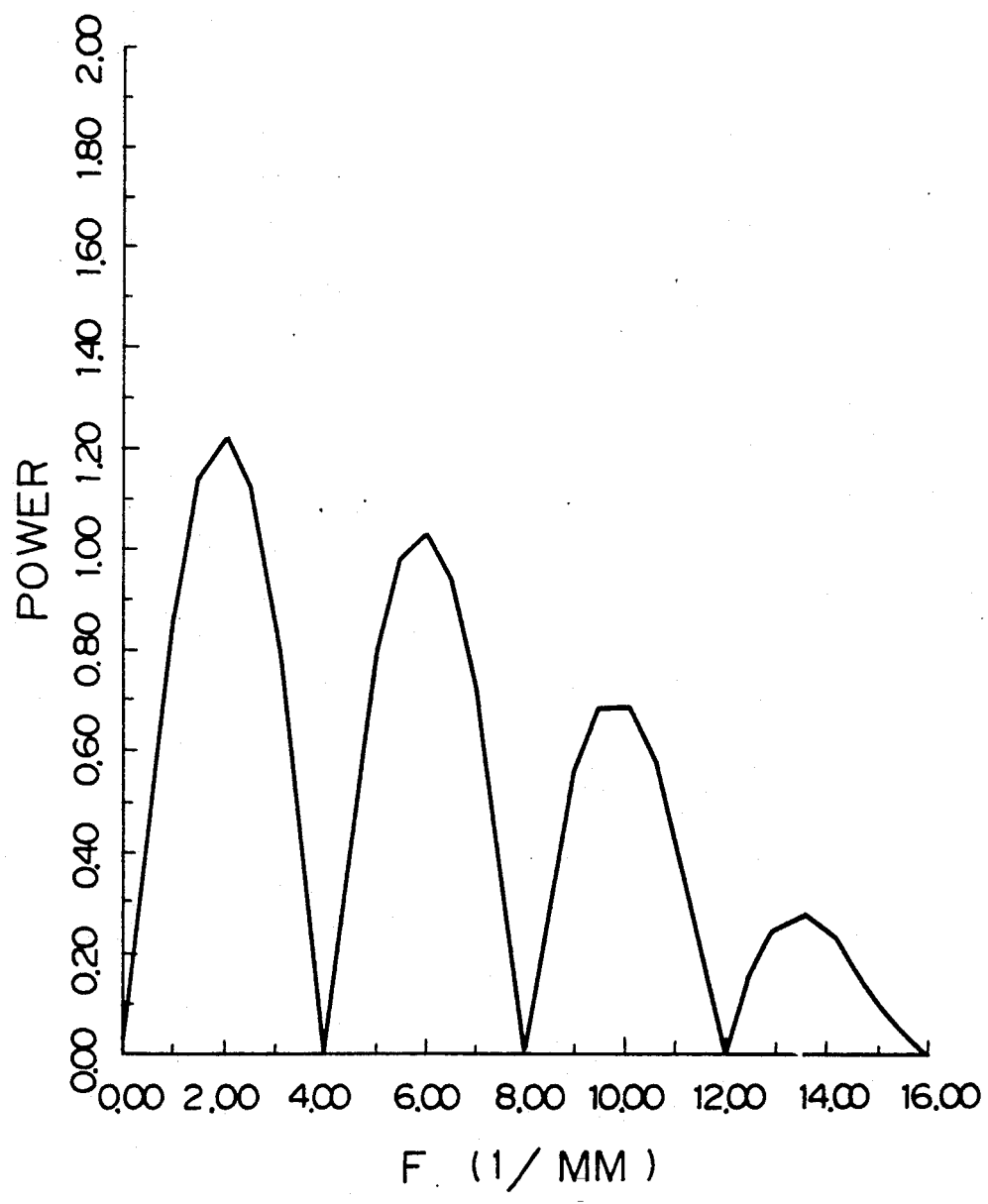
Figure 5:
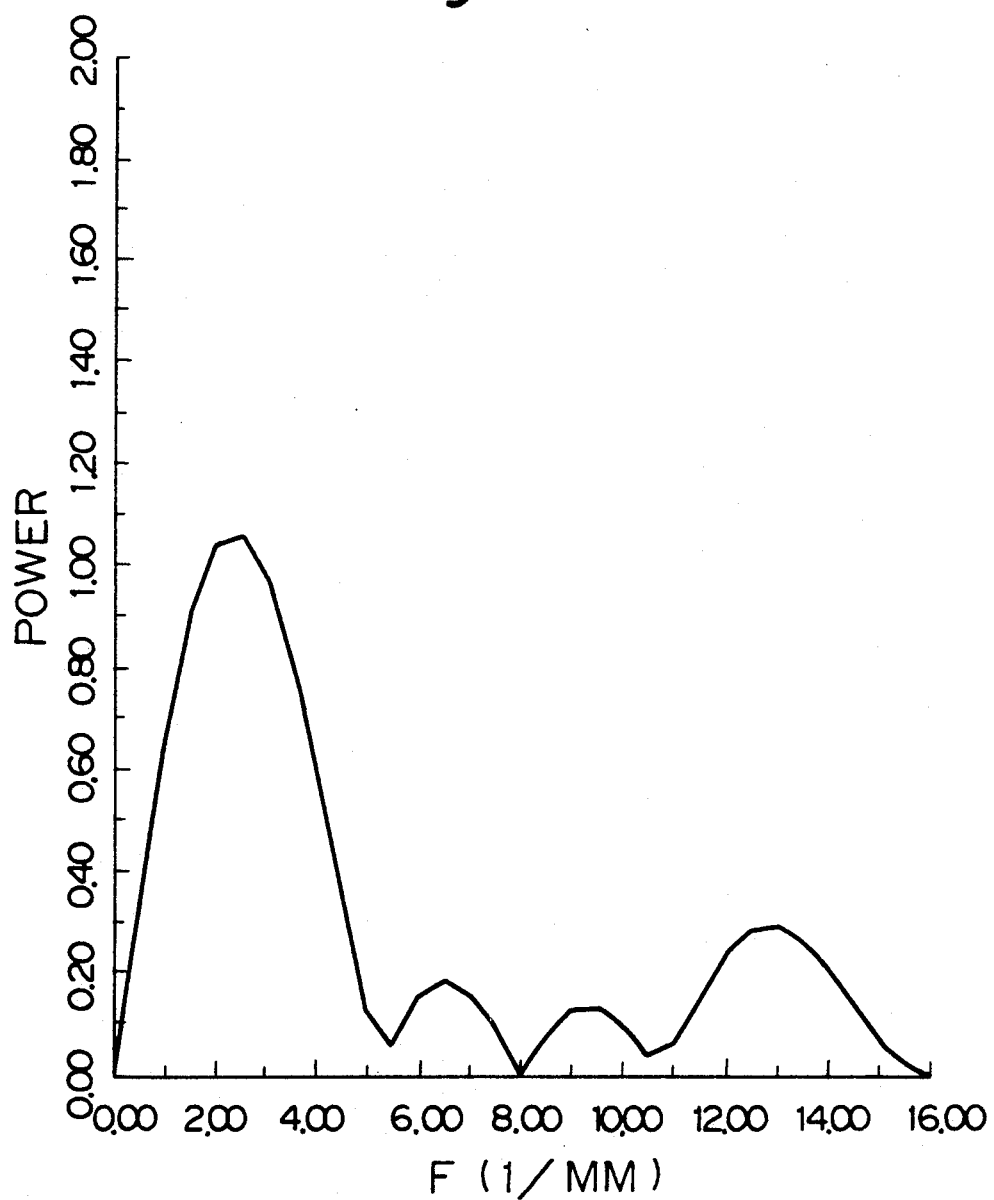

In the case of the dither matrix of the size of 5×5, the one-dimensional FFT of the quadratic differentiation filter (−1, 0, 2, 0, −1) is shown in FIG. 3, the one-dimensional FFT of the linear differentiation filter (−1, 0, 0, 0, 1) is shown in FIG. 4, and the one-dimensional FFT of another linear differentiation filter (−1, −1, 0, 1, 1) is shown in FIG. 5.

The peaks appear at the positions of 4 (1/mm), 2 (1/mm), and 2.5 (1/mm), respectively. When comparing with the spatial frequencies of the mesh image in Table 1, in the case of the linear differentiation filter, condition 1 is satisfied for all line numbers in Table 1; however, in the case of the quadratic differentiation filter, condition 1 cannot be satisfied at 45° with line numbers of 120 and 133, so that the meshes are detected as edges. When comparing two kinds of linear differentiation filters, the filter (−1, −1, 0, 1, 1) having a larger pulse width is superior. This is because, as the pulse width increases, the intensity of the second peak decreases, and a large pulse width makes it possible to widely detect the edge area (the edges in this area are emphasized). When the linear differentiation filter (−1, −1, 0, 1, 1) is used for the edge detection and the quadratic differentiation filter (−1, 0, 2, 0, −1) is used for the edge emphasis, their peak frequencies become 2.5 (1/mm) and 4 (1/mm), respectively, so that condition 2 is satisfied. Namely, the area where, the edges ought to be emphasized is extracted by means of the edge detection and the spatial filter fitted to present the sharp edges is used for the edge emphasis.

Figure 6:
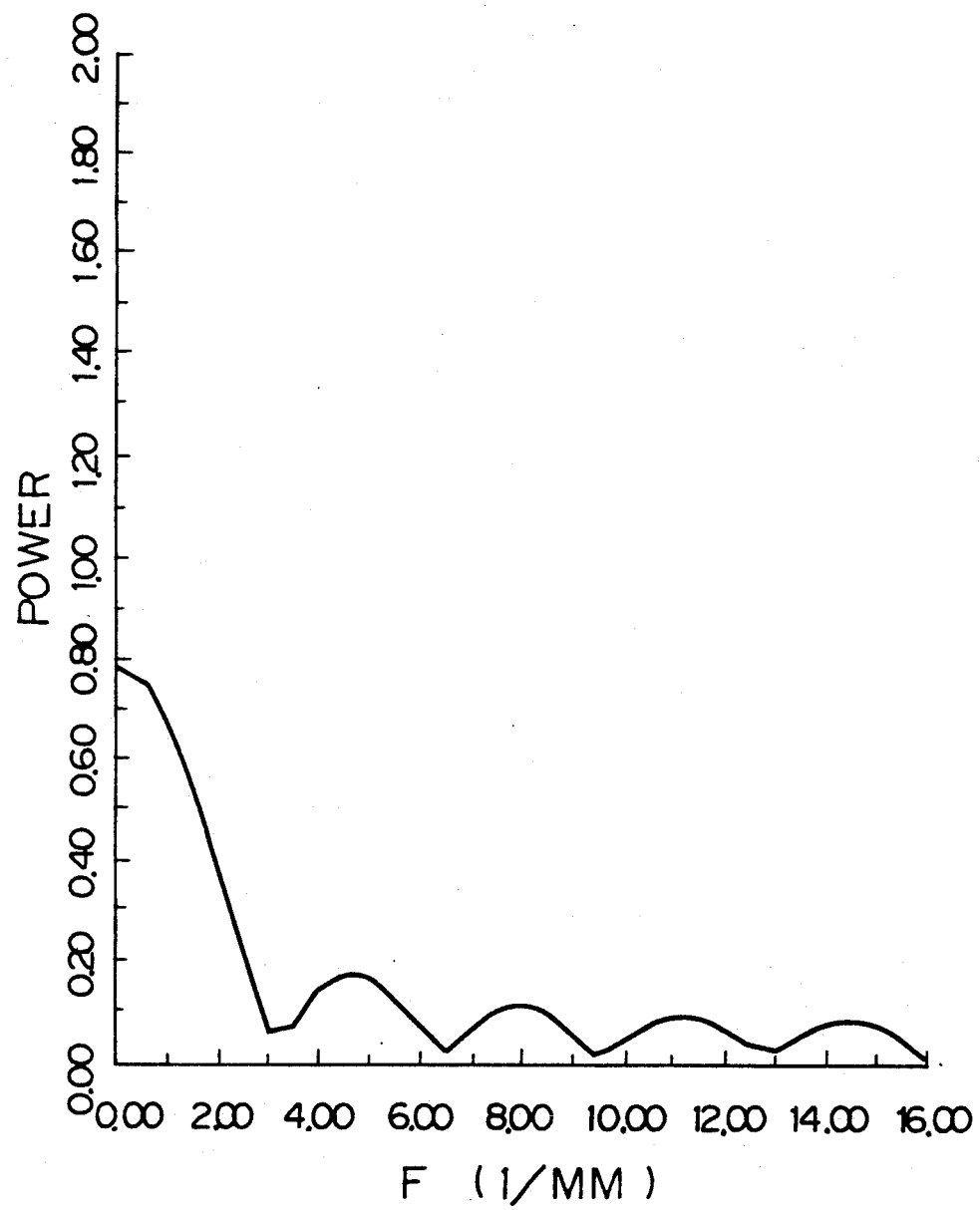
FIG. 6 is a frequency characteristic diagrams of a smoothing filter.

The frequency characteristic of the one-dimensional FFT of the smoothing filter (1, 1, 1, 1, 1) of 5×5 is shown in FIG. 6. The intensity is small at frequencies over the fundamental frequency 3.341 (1/mm) of the mesh image of 120 lines at angles over 45°. In addition, the intensity is sufficiently small at the pitch 4 (1/mm) of the dither matrix of 4×4 that condition 3 is satisfied.

According to this embodiment, by use of the spatial filters having the frequency characteristics such as mentioned in conditions 1 to 3 for the edge detector, edge emphasizer, and smoothing circuit, the flat portion of the image and the mesh image are determined to be the non-edge areas and they are averaged due to the smoothing process, while the characters, line drawings, and edge portions of the images are decided to be edge areas and these edges are emphasized. On the other hand, at the boundary of the edge area and the non-edge area, these areas are continuously connected by changing the mixture ratio by the mixer in accordance with the signal of the edge detector. In this manner, the moire in the case of the mesh image is prevented and the meshing of characters and the reduction of sharpness of images are prevented. Further, the occurrence of the change of the discontinuous texture between the edge area and the non-edge area is prevented. In addition, there is no need to use spatial filters of large matrix sizes, so that the scale of the hardware circuit can be reduced and the embodiment is also advantageous for manufacture using LSI.

Figure 7:
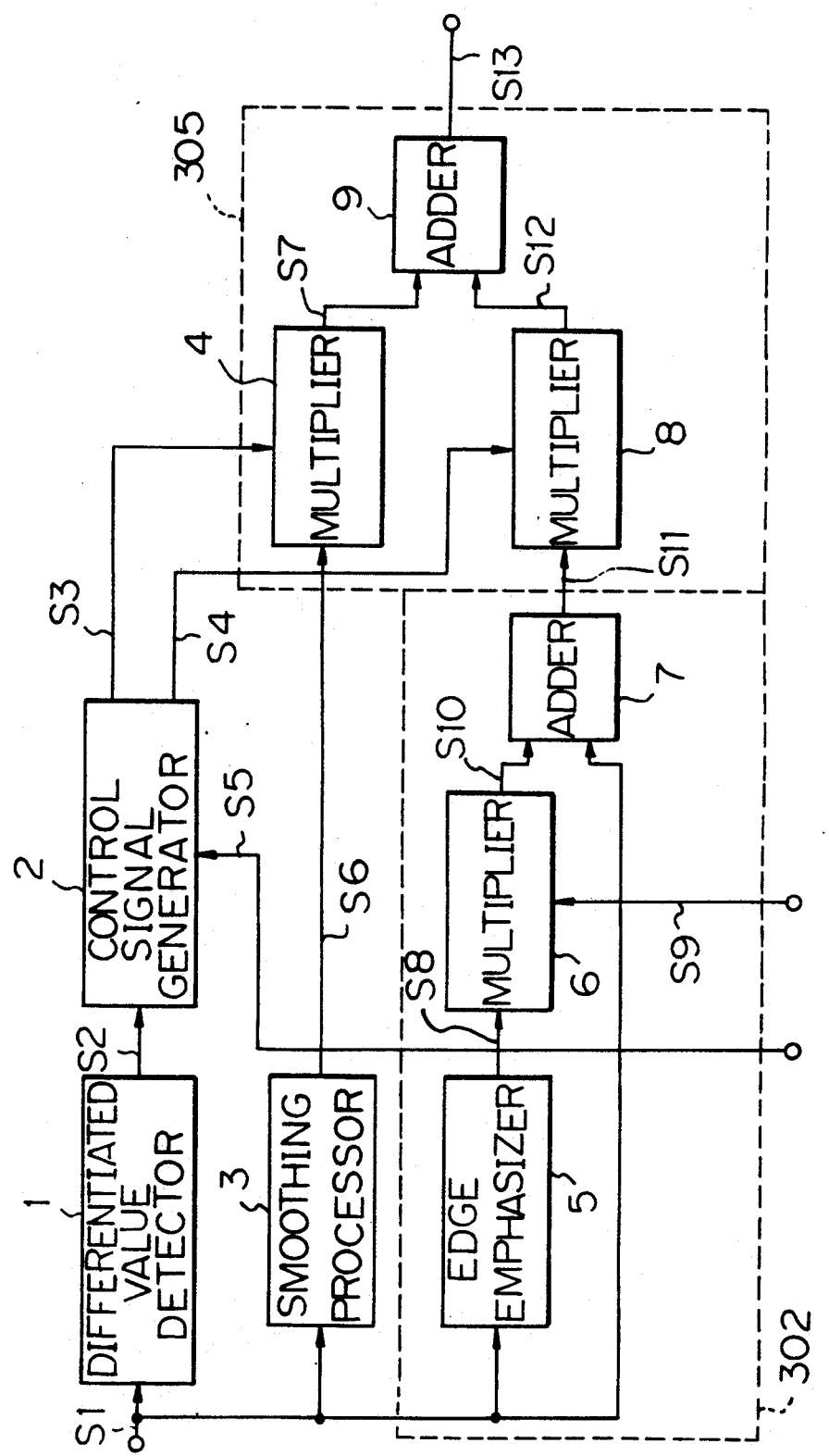
FIG. 7 is an image processing block diagram of an embodiment.

FIG. 7 is a block diagram showing an embodiment of the present invention. Reference numeral $S_1$ denotes an input image signal and 1 is a differentiated value detector to detect the absolute value of the linear differentiated value of the input image signal $S_1$ corresponds to a in FIG. 1. $S_2$ is a differentiation signal connected to an output of the differentiated value detector 1; 2 is a control signal generator to produce control signals $S_3$ and $S_4$ from the differentiation signal $S_2$; $S_3$ the control signal which is an output of the generator 2; $S_4$ the control signal which is also an output of the generator 2 and is complementary with the control signal $S_3$; and 3 a smoothing processor to smooth the input image signal $S_1$ and corresponds to c in FIG. 1. $S_6$ is a smoothing image signal smoothed by the smoothing processor 3; 4 is a multiplier to get the product of the smoothing image signal $S_6$ and the control signal $S_3$; $S_7$ an output of a multiplier 4; 5 an edge emphasizer to emphasize the edge portion of the input image signal $S_1$; $S_8$ an edge signal of the edge emphasizer 5; $S_9$ a constant which is given from the outside; 6 a multiplier to get the product of the edge signal $S_8$ and the constant $S_9$; $S_{10}$ an edge signal which is outputted from the multiplier 6; and 7 an adder to get the sum of the edge signal $S_{10}$ and the input image signal $S_1$. The edge emphasizer b shown in FIG. 1 is constituted by the edge emphasizer 5, multiplier 6, and adder 7.

$S_{11}$ is an edge emphasizing image signal as an output of the adder 7; 8 a multiplier to get the product of the edge emphasizing image signal $S_{11}$ and the control signal $S_4$; $S_{12}$ an output of the multiplier 8; 9 an adder to get the sum of the outputs $S_7$ and $S_{12}$; and $S_{13}$ a processing image signal as an output of the adder 9. The mixer d shown in FIG. 1 is constituted by the multipliers 4 and 8 and adder 9.

In an edge emphasizer 302 corresponding to the edge emphasizer b, the multiplier 6 multiplies the output of the edge emphasizer (or edge detector) 5 with the control signal $S_9$. The multiplier 6 may be constituted by a ROM or the like and the control signal $S_9$ is not limited to a multiplication coefficient but may be a coded signal.

Assuming that an objective pixel to be image processed is A, the objective pixel and the value of which the edge detection amount was multiplied with a certain coefficient are added by the adder 7, so that the objective pixel is edge emphasized. In mixer 305, an output of the edge emphasizer 302 is mixed with the output of the smoothing processor 3 at a proper mixture ratio. Either the control signal $S_3$ or signal $S_4$ is outputted to the adder 9 in response to the output of the differentiated value detector 1 which is inputted to the control signal generator 2 at the front stage of the mixer 305. The control signals $S_3$ and $S_4$ are not necessarily limited to the complementary signals, as will be explained hereinafter. The characteristics of the control signals $S_3$ and $S_4$ may be arbitrarily selected by the control signal $S_5$. In the multiplier 8, the output of the edge emphasizer 302 is multiplied on the basis of the control signal $S_4$. In the multiplier 4, the output of the smoothing processor 3 is multiplied on the basis of the control signal $S_3$. The outputs of the multipliers 4 and 8 are added by the adder 9 and the added signal becomes the image processing output.

The block diagram of FIG. 7 can be expressed by the following expressions.

First, the differentiated value detector 1 and control signal generator 2 execute the following arithmetic operation of expression (1);

$$E = f(\begin{bmatrix} 1 & 1 & 1 & 1 & 1 \\ 1 & 1 & 1 & 1 & 1 \\ 0 & 0 & 0 & 0 & 0 \\ -1 & -1 & -1 & -1 & -1 \\ -1 & -1 & -1 & -1 & -1 \end{bmatrix}^{*1} \cdot I +$$ (Expression 1)

-continued $$\begin{bmatrix} 1 & 1 & 0 & -1 & -1 \\ 1 & 1 & 0 & -1 & -1 \\ 1 & 1 & 0 & -1 & -1 \\ 1 & 1 & 0 & -1 & -1 \\ 1 & 1 & 0 & -1 & -1 \end{bmatrix}^{*2} \cdot I\ )$$

where, I denotes the input image data, E is the control signal $S_4$, and f is a normalizing function normalize the control signal $S_4$ to the maximum value 1.

The following output is derived from the adder 7

$$G = I + k_1 \begin{bmatrix} 0 & 0 & -1 & 0 & 0 \\ 0 & 0 & 0 & 0 & 0 \\ -1 & 0 & 4 & 0 & -1 \\ 0 & 0 & 0 & 0 & 0 \\ 0 & 0 & -1 & 0 & 0 \end{bmatrix} \cdot I$$ (Expression 2)

where, G denotes the output of the adder 7 and $k_1$ is the constant of the constant signal $S_9$. The following output is obtained from the smoothing processor 3

$$H = \begin{bmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{bmatrix} \cdot I$$ (Expression 3)

where, H is the output of the smoothing processor 3. Thus, the value $O_{ut}$ of the output $S_{13}$ of the adder 9 can be expressed by the following expression (4)

$$O = E \cdot \left( I + k_1 \cdot \begin{bmatrix} 0 & 0 & -1 & 0 & 0 \\ 0 & 0 & 0 & 0 & 0 \\ -1 & 0 & 4 & 0 & -1 \\ 0 & 0 & 0 & 0 & 0 \\ 0 & 0 & -1 & 0 & 0 \end{bmatrix}^{*3} I \right) +$$ (Expression 4)

$$(1 - E) \left( \begin{bmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{bmatrix}^{*4} I \right)$$

The kernels shown in [ ] in expression (4) are convolved together with the image signal I. Various modified forms are considered as the kernels *1 to *4 and examples of them are shown in Table 2.

TABLE 2

| *1 | | | | | | *2 | | | | |
|---|---|---|---|---|---|---|---|---|---|---|
| 1 | 1 | 1 | 1 | 0 | | 0 | 1 | 1 | 1 | 1 |
| 1 | 1 | 1 | 0 | -1 | | -1 | 0 | 1 | 1 | 1 |
| 1 | 1 | 0 | -1 | -1 | | -1 | -1 | 0 | 1 | 1 |
| 1 | 0 | -1 | -1 | -1 | | -1 | -1 | -1 | 0 | 1 |
| 0 | -1 | -1 | -1 | -1 | | -1 | -1 | -1 | -1 | 0 |

TABLE 2-continued

*3

| -1 | 0 | 0 | 0 | -1 |
|---|---|---|---|---|
| 0 | 0 | 0 | 0 | 0 |
| 0 | 0 | 4 | 0 | 0 |
| 0 | 0 | 0 | 0 | 0 |
| -1 | 0 | 0 | 0 | -1 |

*4

| 1 | 1 | 1 | 1 | 1 |
|---|---|---|---|---|
| 1 | 2 | 2 | 2 | 1 |
| 1 | 2 | 3 | 2 | 1 |
| 1 | 2 | 2 | 2 | 1 |
| 1 | 1 | 1 | 1 | 1 |

Figure 8:
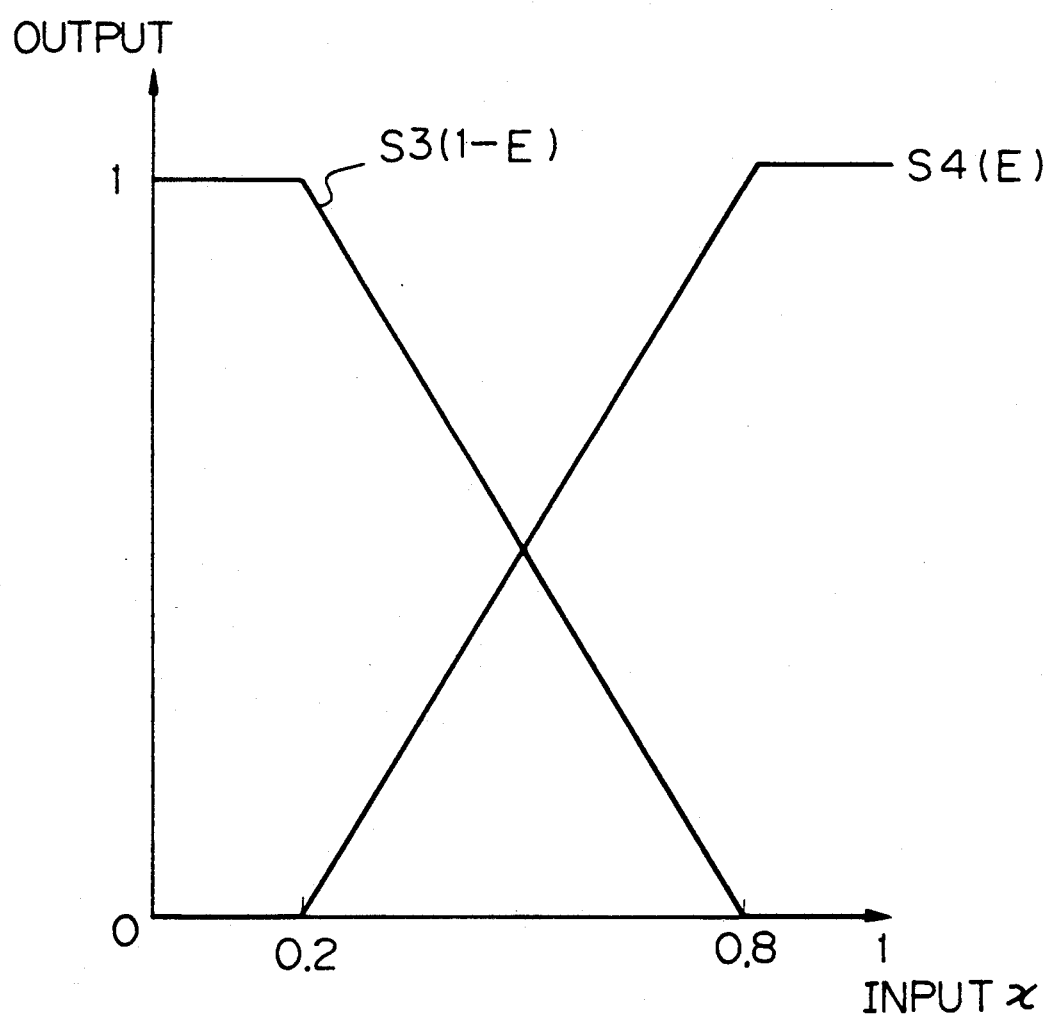
FIG. 8 is a gamma conversion characteristic diagram of a control signal generator 2.

FIG. 8 shows an example of the characteristic of the function f which the control signal generator 2 has.

In $E = f(x)$, $E = 0$ for $0 \leq x < 0.2$ $E = 1.67 \times -0.33$ for $0.2 \leq x < 0.8$ $E = 1$ for $0.8 \leq x \leq 1$ An explanation will be made with respect to the case where the input and output signals are normalized to 0 to 1.

Figure 9:
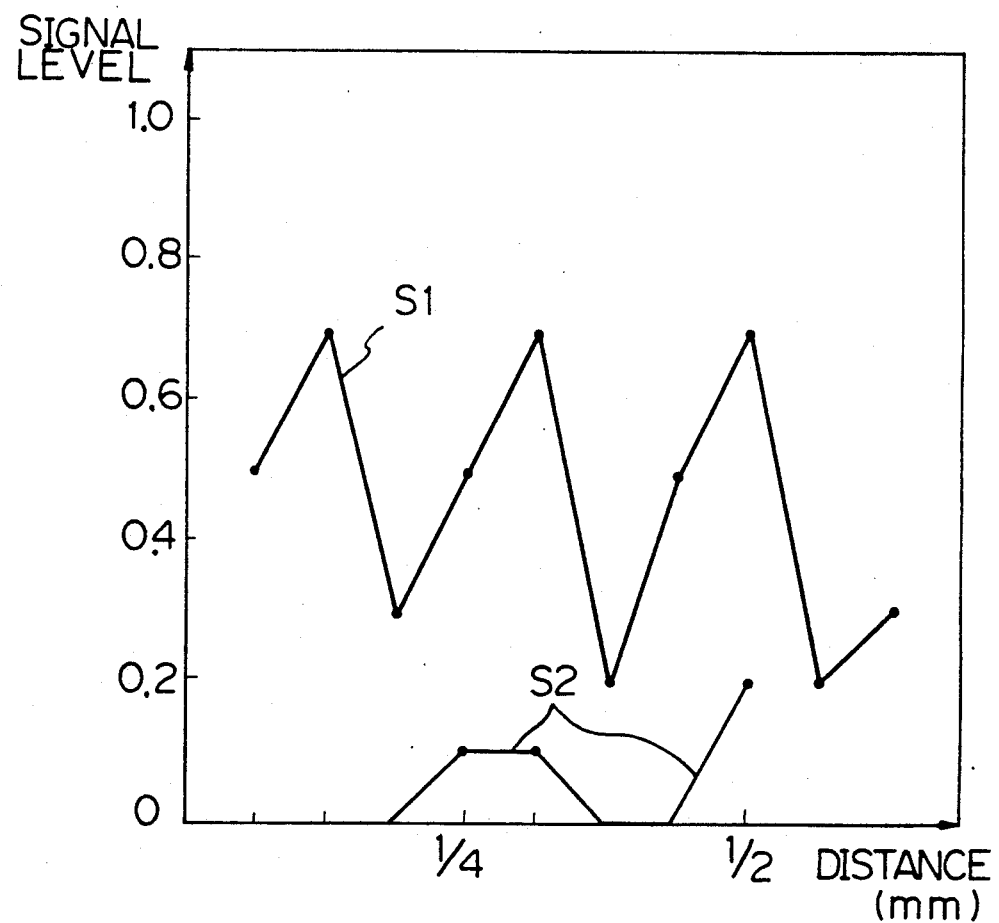
FIGS. 9 and 10 are diagrams showing examples of the operation of a differentiated value detector 1 to perform the linear differentiation.
Figure 10:
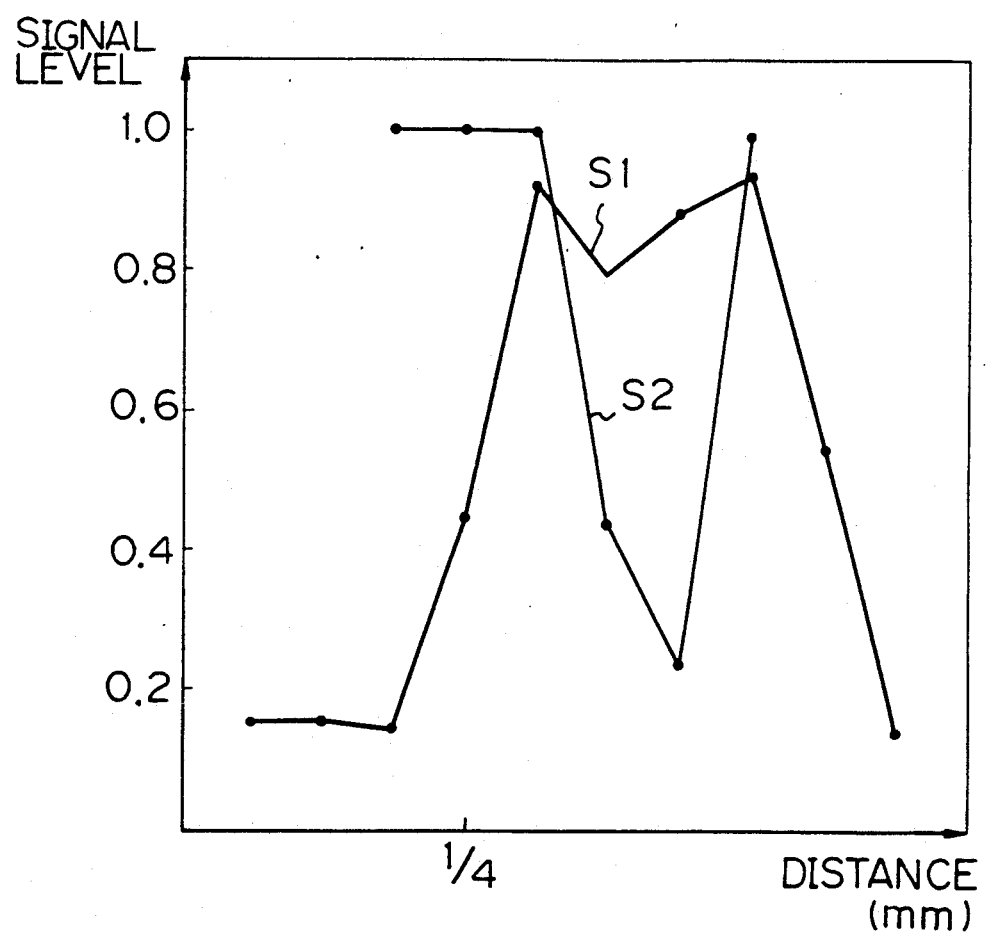

FIGS. 9 and 10 are diagrams for explaining the operation of the edge detector 1 due to the linear differentiation (hereinafter, this detector is referred to as the differentiated value detector). These diagrams are shown in one dimension in the main scanning direction.

As already explained above, since the differentiated value detector 1 serves as a kind of band-pass filter, in the case where the input image signal $S_1$ such as the mesh image having the high frequency component shown in FIG. 9 is convoluted by the kernel $(-1, -1, 0, 1, 1)$ in the main scanning direction, the output signal $S_2$ becomes a small value such as 0.1 to 0.2.

On the contrary, in the case of the input image signal of a relatively low frequency (for example, vertical lines of characters, or the like), the output signal $S_2$ becomes a large value due to the similar convoluting process as shown in FIG. 10.

The control signal generator 2, which performs the gamma conversion, sets the control signal $S_3$ to 1 and sets the control signal $S_4$ to 0 when the differentiation signal $S_2$ is smaller than 0.2 as shown in FIG. 8. On the other hand, when the differentiation signal $S_2$ is larger than 0.8, the control signal $S_3$ is set to 0 and the control signal $S_4$ is set to 1. Further, when the differentiation signal $S_2$ lies within the range of 0.2 to 0 8, as shown in FIG. 8, the control signals $S_3$ and $S_4$ vary in accordance with the differentiation signal $S_2$ such that the sum of the control signals $S_3$ and $S_4$ always becomes 1.

The input image signal $S_1$, on one hand, is connected to the input of the differentiated value detector 1 and is also simultaneously connected to the inputs of the smoothing processor 3 and edge emphasizer (or detector) 5.

Figure 11:
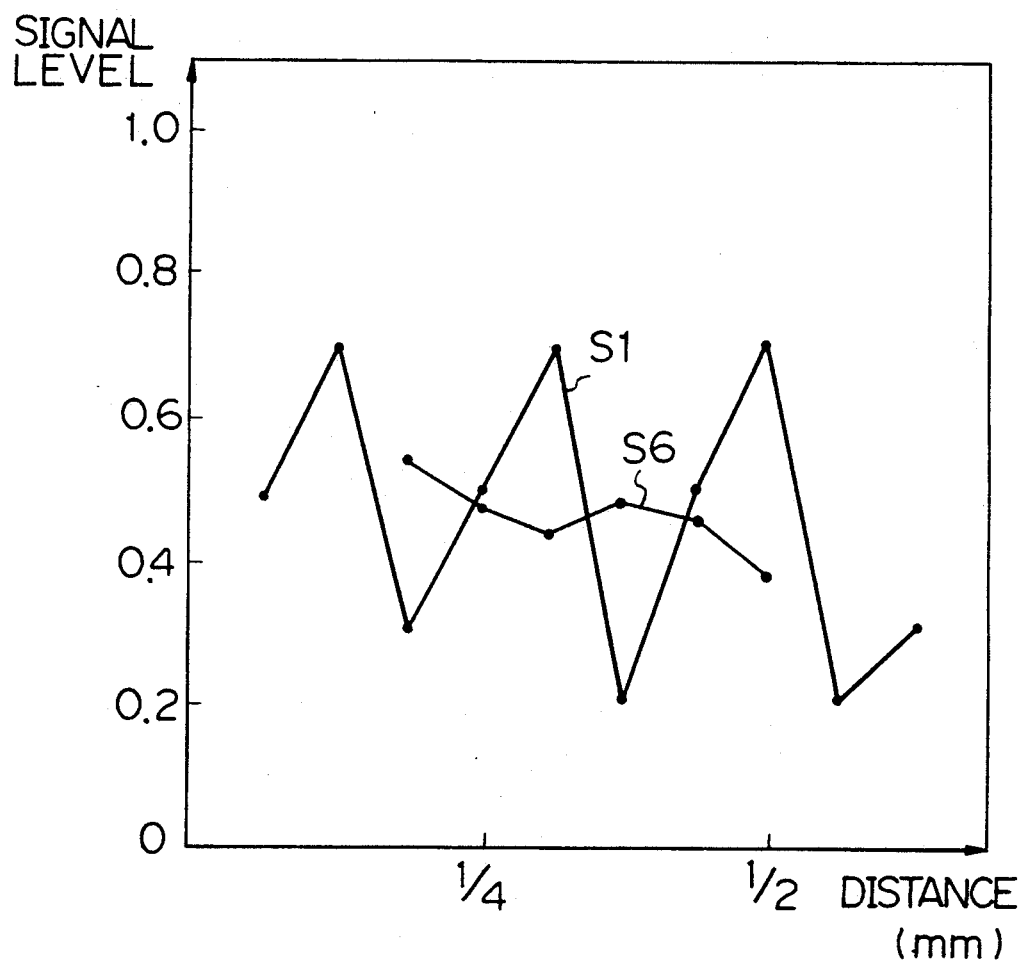
FIG. 11 is a diagram showing an example of the operation of a smoothing processor 3.

FIG. 11 shows the operation of the smoothing processor 3 and this diagram is shown as an example of one dimension in the main scanning direction for explanation. In this case, the kernel is (1, 1, 1, 1, 1) and has the content of all 1 and the low-pass filter is constituted so as to output the mean value of five pixels. The input image signal $S_1$ becomes similar to the smoothing image signal $S_6$.

Figure 12:
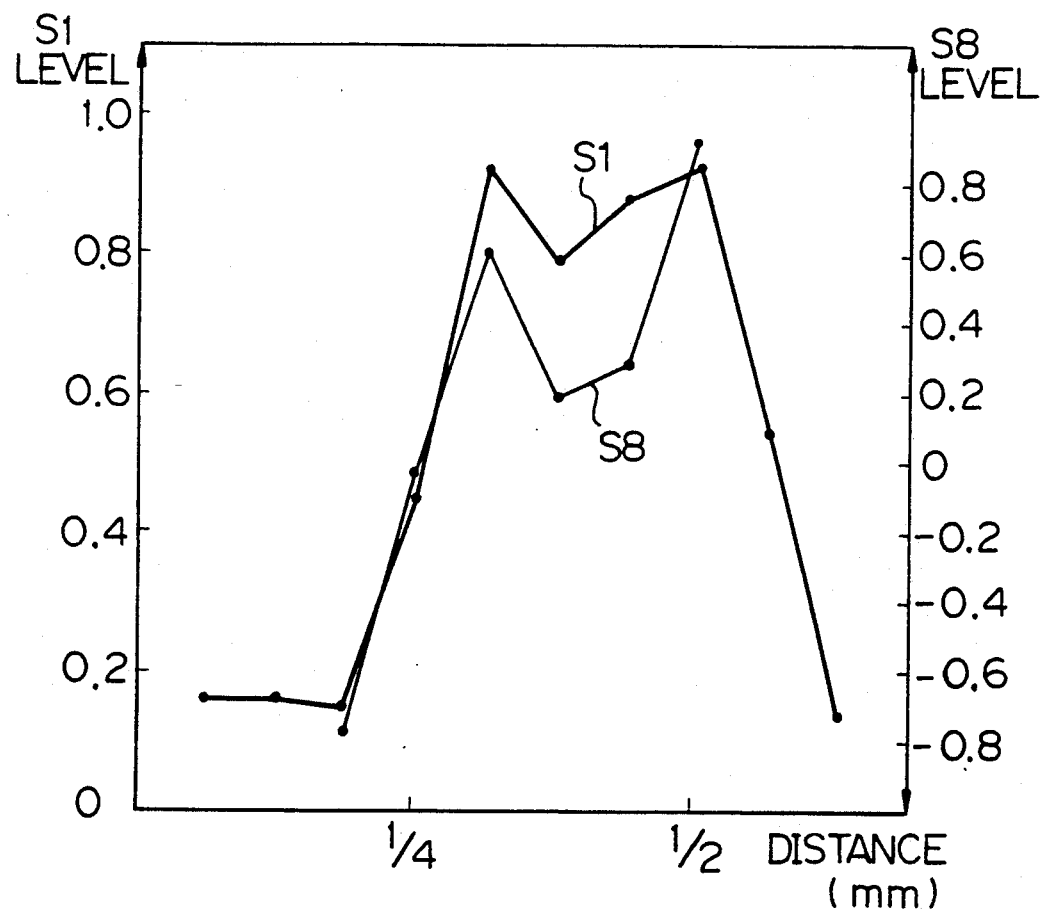
FIG. 12 is a diagram showing an example of the operation of an edge emphasizer 5.

FIG. 12 shows the operation of the edge emphasizer 5 and the diagram of one dimension in the main scanning direction is likewise illustrated for explanation. The kernel is $(-1, 0, 2, 0, -1)$ and has the well-known edge detection characteristic of the quadratic differentiation. The output $S_8$ has the peak of 0 in the flat portion and has the peaks of positive and negative values in the edge portions.

The edge signal $S_8$ is multiplied with the constant $S_9$ by the multiplier 6 and is added to the image input signal $S_1$ by the adder 7, so that the edge emphasizing signal $S_{11}$ is derived. Although not shown, since the edge signal $S_{10}$ is slightly delayed than the input image singal $S_1$, a delay circuit to coordinate the timings of the edge signal $S_{10}$ and input image signal $S_1$ which are inputted to the adder 7 is actually provided.

The control signal $S_3$ is small and the control signal $S_4$ is large in the edge portion where the output of the differentiated value detector 1 is large. On the contrary, when the differentiation signal $S_2$ is small, the signal $S_3$ is large and the signal $S_4$ is small. As mentioned in conjunction with FIG. 8, the control signals $S_3$ and $S_4$ are gamma converted so that the sum of them always becomes 1. Therefore, the sum of the outputs of the multipliers 4 and 8 is controlled such that the component of the edge emphasizing signal $S_{11}$ increases when the differentiation signal $S_2$ is large and the component of the smoothing image signal $S_6$ increases when the signal $S_2$ is small.

Figure 13:
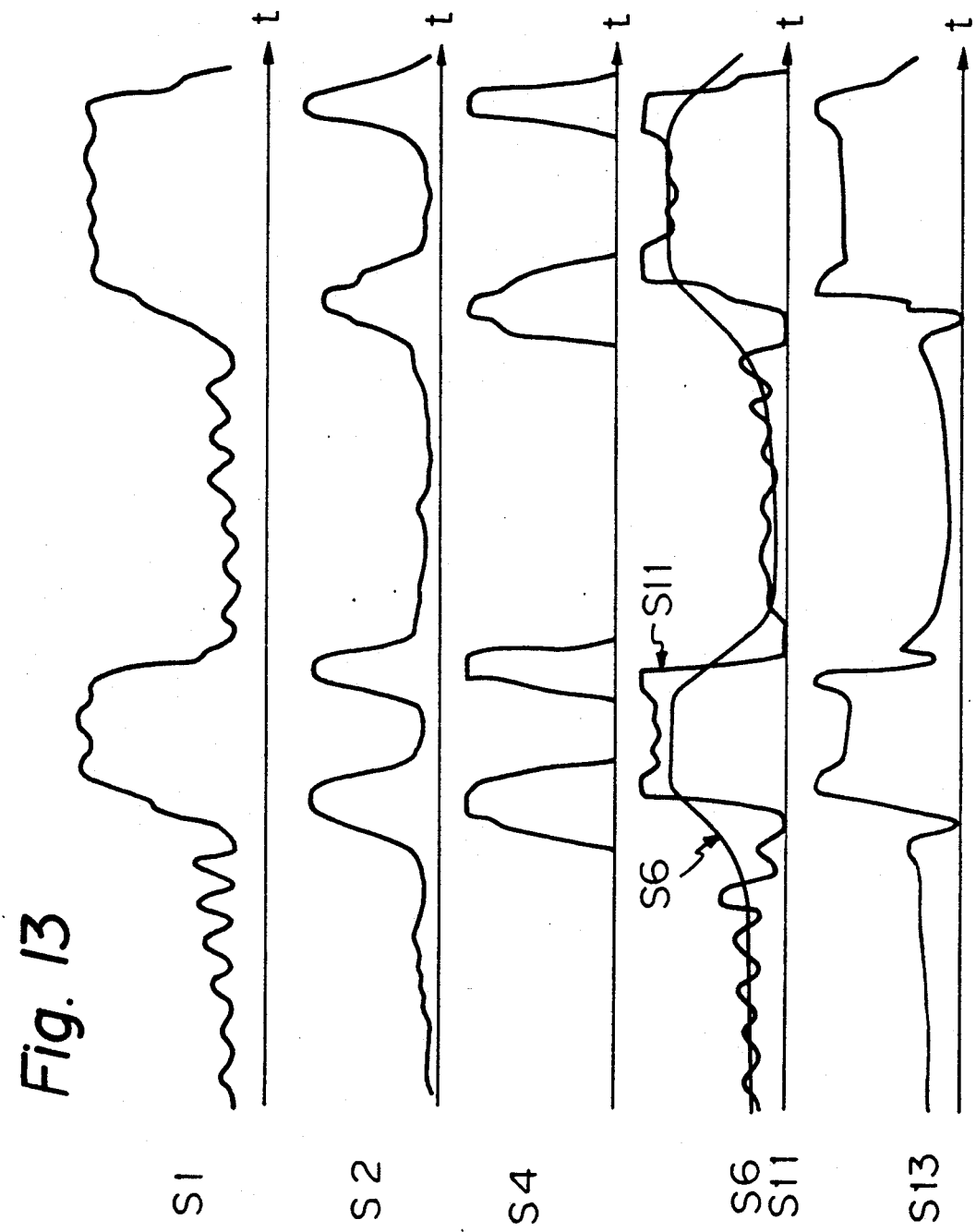
FIG. 13 is a signal waveform diagram of each section in FIG. 7.

FIG. 13 shows the above-mentioned situation, in which the differentiation signal $S_2$ represents that the edges are detected in the portions excluding vibrations having a small period (corresponding to the mesh period) in the input image signal $S_1$.

The control signal $S_4$ is derived by gamma converting the differentiation signal $S_2$ and the portions other than four mountains of the signal $S_2$ shown in FIG. 13 are set to 0. The control signal $S_3$ corresponds to the signal of $(1-S_4)$. FIG. 13 further shows the smoothing signal $S_6$ and edge emphasizing signal $S_{11}$ In FIG. 13, the processing signal $S_{13}$ denotes that the mesh portions of which the signals $S_6$ and $S_{11}$ were added at the mixture ratio of the signals $S_3$ and $S_4$ were smoothed and only the edge portions were emphasized.

Each block in FIG. 7 will be described in detail hereinbelow.

Differentiated Value Detector 1

Figure 14:
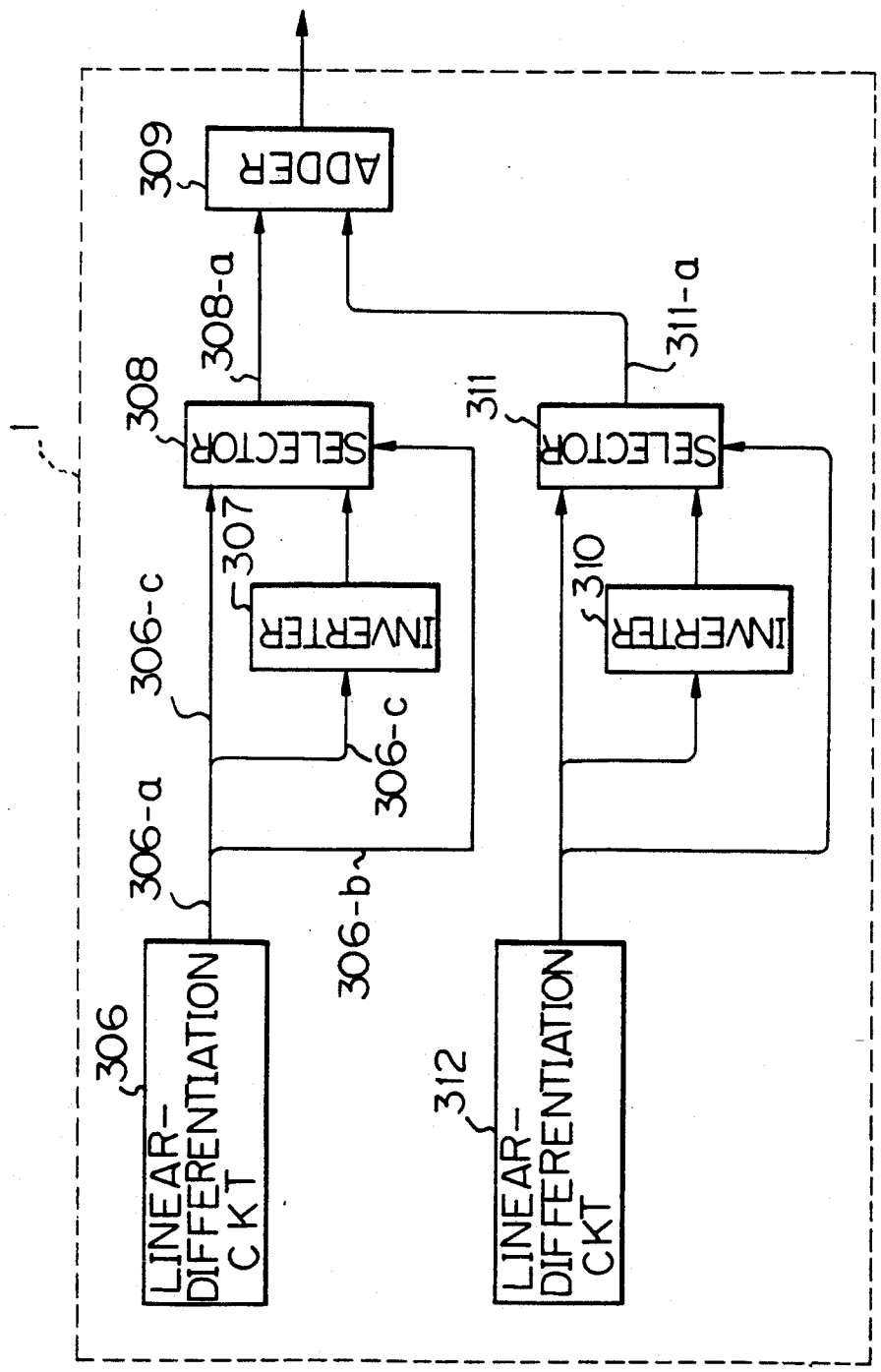
FIG. 14 is a detailed circuit diagram of the differentiated value detector 1.

FIG. 14 is a detailed circuit diagram of the differentiated value detector 1.

Figure 20:
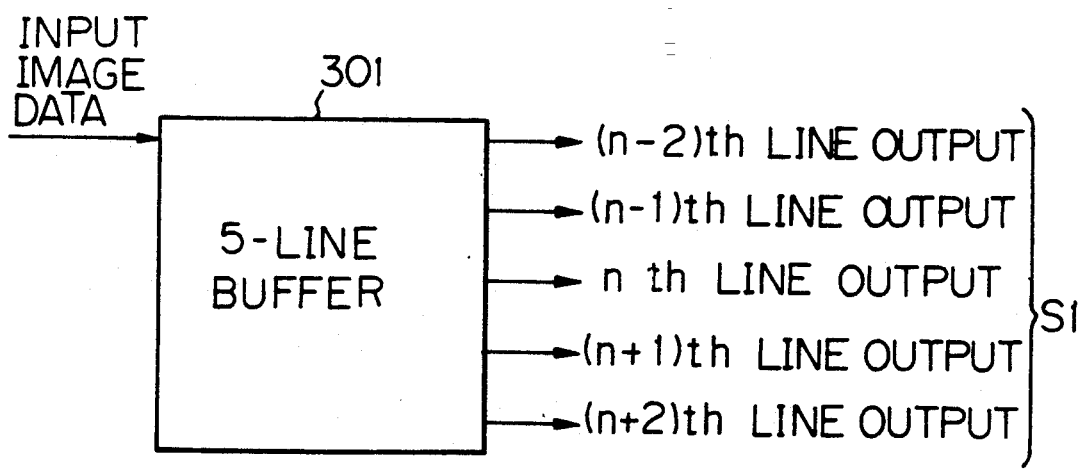
FIG. 20 is a buffer circuit diagram.

An output of a 5-line buffer 301 in FIG. 20 is inputted to the detector 1.

In FIG. 14, an output 306-a of a linear differentiation circuit 306 is divided into a data portion 306-c and a sign portion 306-b indicative of positive/negative signs. The sign portion 306-b is inputted as a selection signal of a selector 308. Either one of the data whose polarity (+ or −) was inverted by an inverter 307 and the data of the data portion 306-c whose polarity is not inverted is selected by the above selection signal, so that an absolute value 308-a of the data is derived. Similarly, an absolute value of an output of a linear differentiation circuit 312 is outputted due to a selector 311. Both outputs 308-a and 311-a of the selectors 308 and 311 are added by an adder 309 and the sum of the linear differentiated values in two directions is outputted from the adder 309.

Figure 15A:
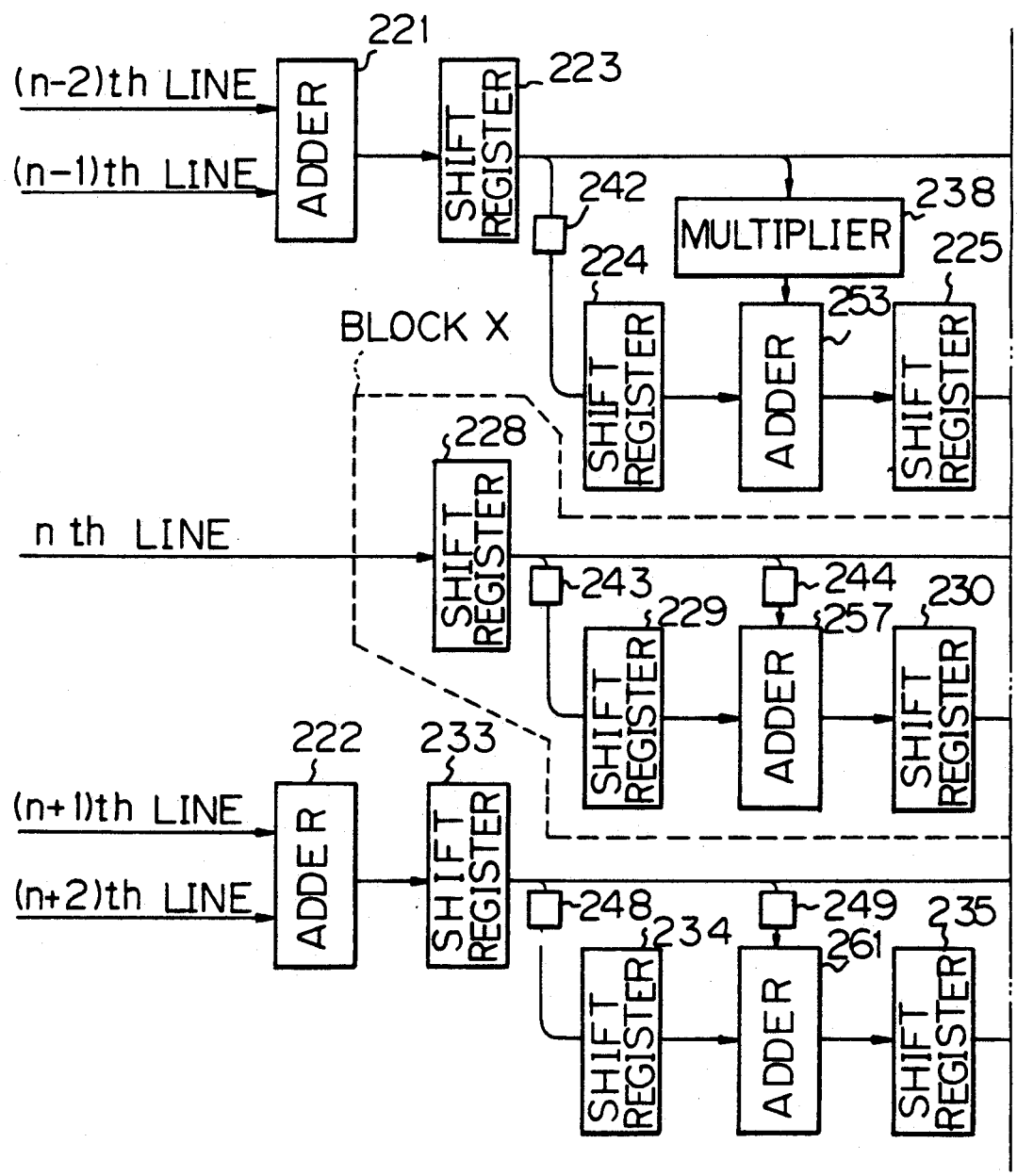
FIG. 15, consisting of FIGS. 15A and 15B is a detailed block diagram of linear differentiation circuite 306 and 312.
Figure 15B:
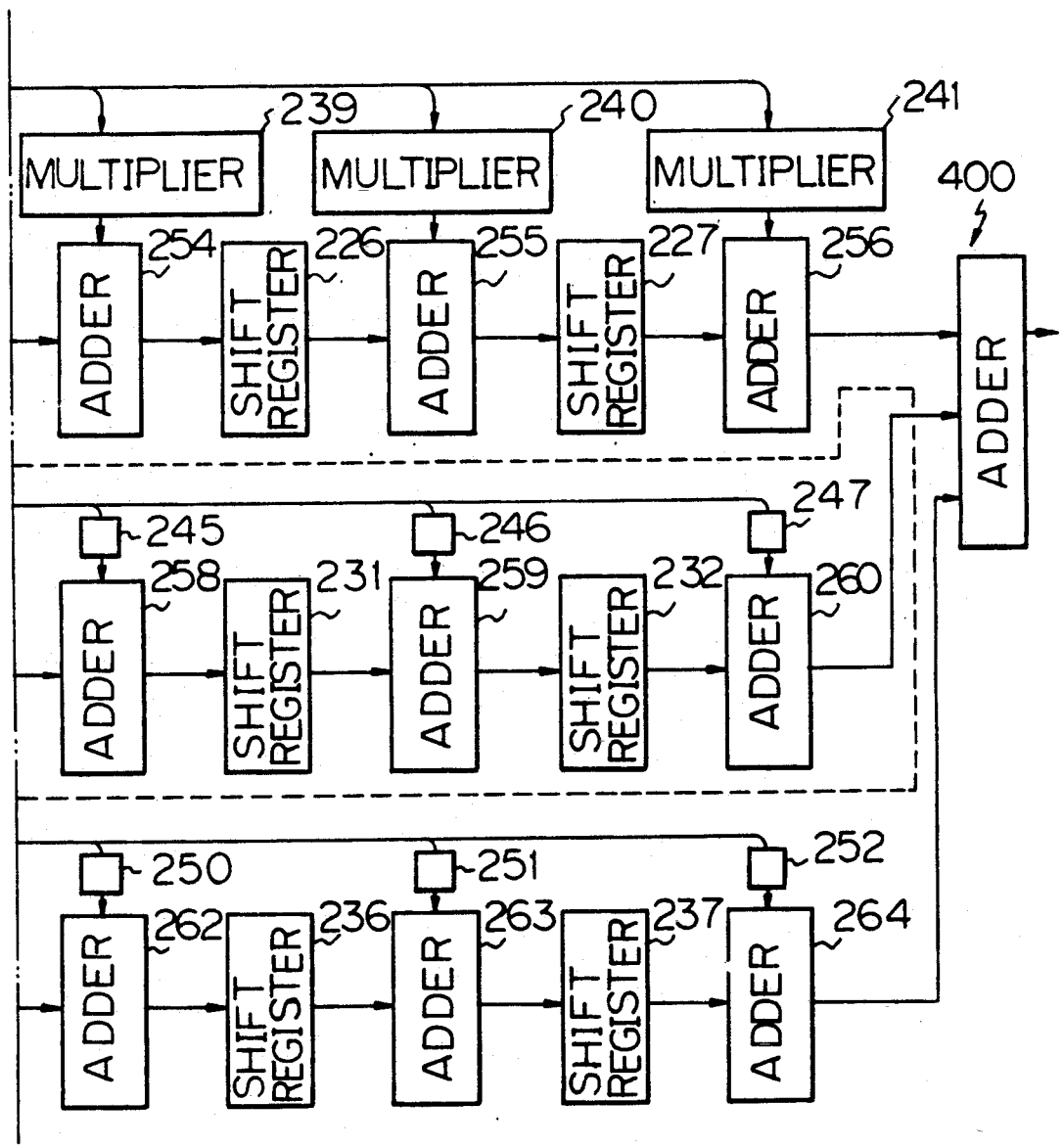

FIG. 15 is a block diagram showing the details of the linear differentiation circuits 306 and 312 in FIG. 14.

Block X in FIG. 15 will be first described to explain the fundamental operations of those linear differentiation circuits.

Figure 16:
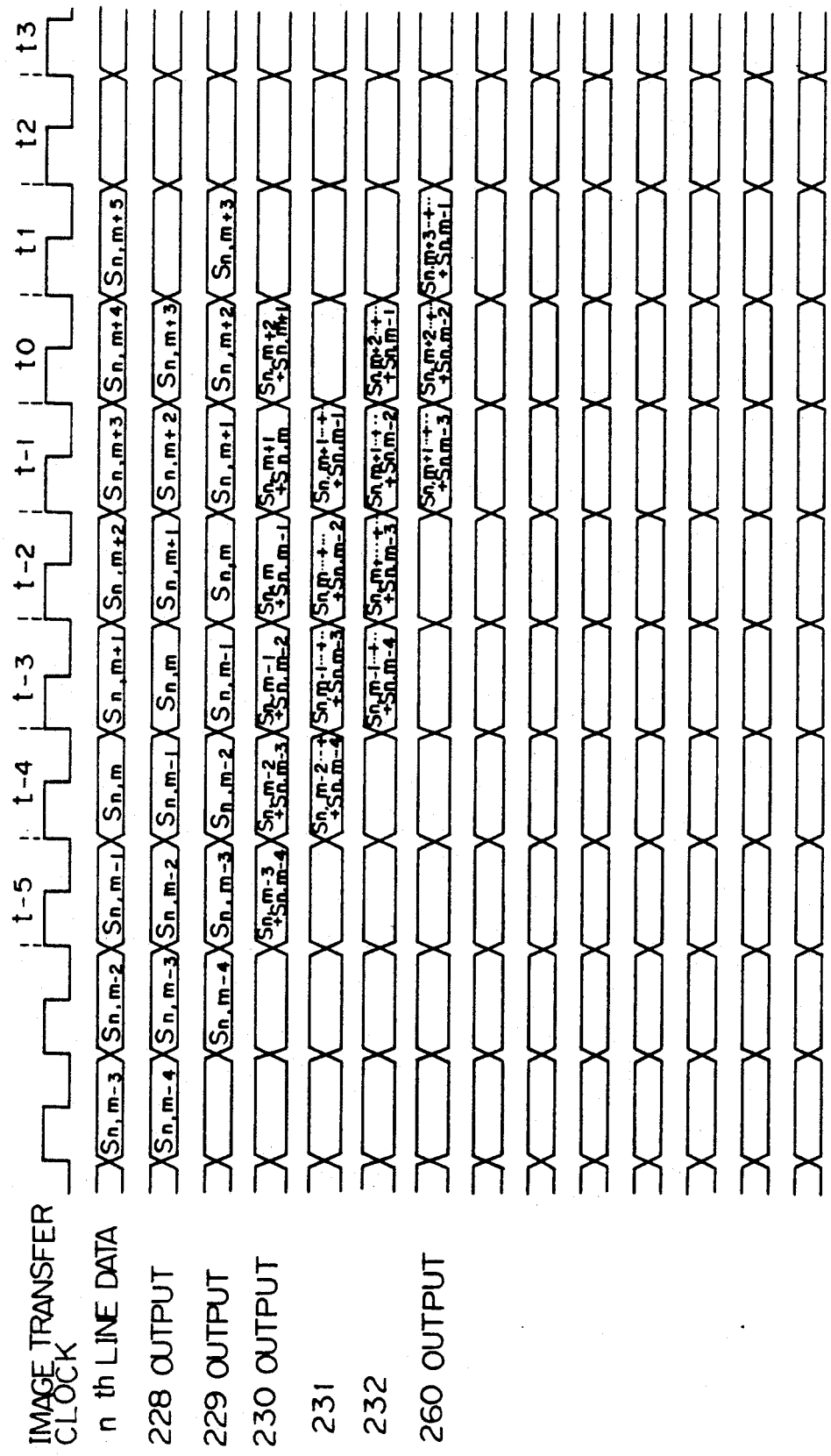
FIG. 16 is a timing chart showing the operation of the linear differentiation circuit.

The contents of all shift registers in FIG. 15 are shifted synchronously with an image transfer clock (not shown). It is now assumed that all multiplication coefficients of multipliers 243 to 247 are 1 for simplicity of explanation. Referring now to a timing chart of FIG. 16, an output of a shift register 230 at time $t_{-3}$ is $S_{n,m-1}+S_{n,m-2}$; an output of a shift register 231 at time $t_{-2}$ is $S_{n,m}+S_{n,m-1}+S_{n,m-2}$; an output of a shift register 232 at time $t_{-1}$ is $S_{n,m+1}+S_{n,m}+S_{n,m-1}+S_{n,m-2}$; and an output of an adder 260 at time $t_0$ is $S_{n,m+2}+S_{n,m+1}+S_{n,m}+S_{n,m-1}+S_{n,m-2}$. In this manner, the added value of five pixels in the main scanning direction is calculated in block X. In this case, by setting the multiplication coefficients of the multipliers 243 to 247 to a, b, c, d, and e, the output of the adder 260 becomes $$e \cdot S_{n,m+2} + d \cdot S_{n,m+1} 30 \ c \cdot S_{n,m} + b \cdot S_{n,m-1} + a \cdot S_{n,m-2}$$

It will be appreciated that the circuits subsequent to the shift register 223 and the circuits subsequent to the shift register 233 operate in a manner similar to the above.

In the case where the linear differentiations to be obtained are as shown in *1 and *2 in expression (1), when the objective pixel exists in the nth line, the elements of the kernels of the (n-2)th line and (n-1)th line are equal and the elements of the kernels of the (n+1)th line and (n+2)th line are also equal. Therefore, after the image data of the (n-2)th and (n-1)th lines was added by an adder 221, by performing the linear differentiating processes such as *1 and *2 in expression (1), the circuit scale can be reduced to ½. In addition, the similar processes are also carried out with respect to the (n+1)th and (n+2)th lines. In this manner, the added value corresponding to the kernels of five lines can be obtained from an adder 400.

Speaking in further detail, in the case of performing the linear differentiation of FIG. 28 in the conventional circuit arrangement, an adder of one line of the (n-2)th line and an adder of one line of the (n-1)th line are individually provided, and an adder of one line of the (n+1)th line and an adder of one line of the (n+2)th line are also needed.

Block X shows an example of the adder of one line, of the nth line.

The linear differentiation circuit shown in FIG. 29 has the conventional circuit arrangement. The embodiment, however, has a circuit arrangement as shown in FIG. 30, thereby reducing block X and the circuit scale to about 3/5.

Figure 31:
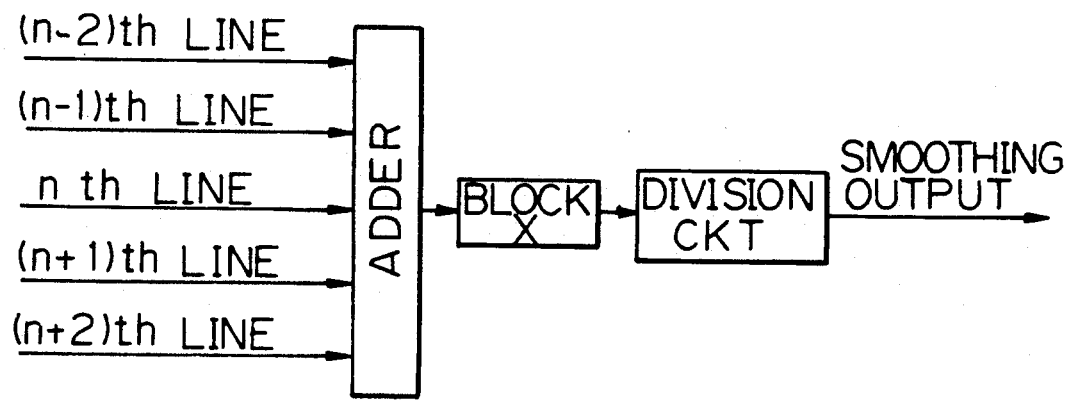

On the other hand, in dependence on the setting of the coefficients of the multipliers in block X, the circuit arrangement shown in FIG. 29 can be directly also used as an edge detection circuit and a smoothing circuit as well as the linear differentiation circuit. However, to accomplish the smoothing process such as shown in, e.g., expression (3), as shown in FIG. 31, after the data of five lines was added, only one block X is used and a simple circuit arrangement is used, then the smoothed output can be derived.

Figure 32:
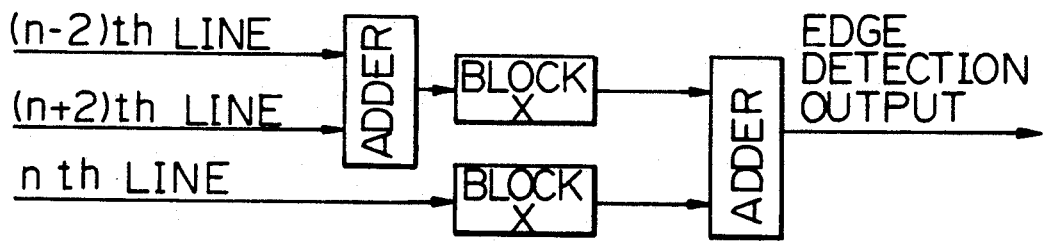

In addition to obtain the edge detection as shown in *3 of expression (4) and *3 in Table 2, the circuit of FIG. 29 can be used as it is, but an arrangement as shown in FIG. 32 may be used.

Figure 17:
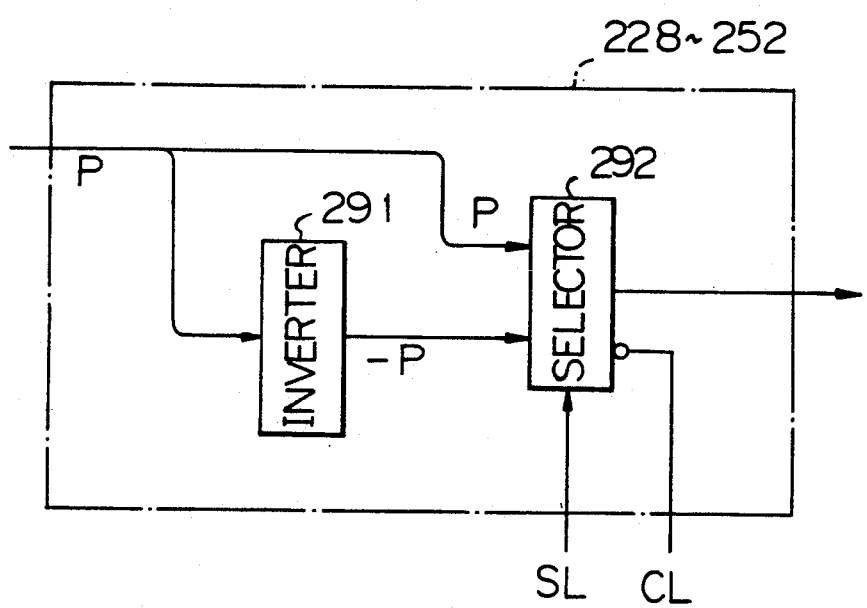
FIG. 17 is a circuit diagram of a multiplier.

In the case where the multiplied values of multipliers indicated at 238 to 252 are simple such as 1 or −1 or −0, as shown in FIG. 17, these multipliers can be easily constituted by an inverter 291 and a selector 292. The switching between 1 and −1 can be performed by a signal SL and the signal level can be set to 0 by a signal CL in FIG. 17.

To obtain the linear differentiation of the kernel *1 in expression (1), the multiplication coefficients of the multipliers 238 to 242 are set to 1, those of the multipliers 243 to 247 are set to 0, and those of the multipliers 248 to 252 are set to −1.

To obtain the linear differentiation of the kernel *2 in expression (1), the multiplication coefficients of the multipliers 242, 238, 239, 240, and 241 set to 1, 1, 0, −1, and −1; those of the multipliers 243 to 247 are set to 1, 1, 0, −1, and −1; and those of the multipliers 248 to 252 are set to 1, 1, 0, −1, and −1.

Figure 18B:
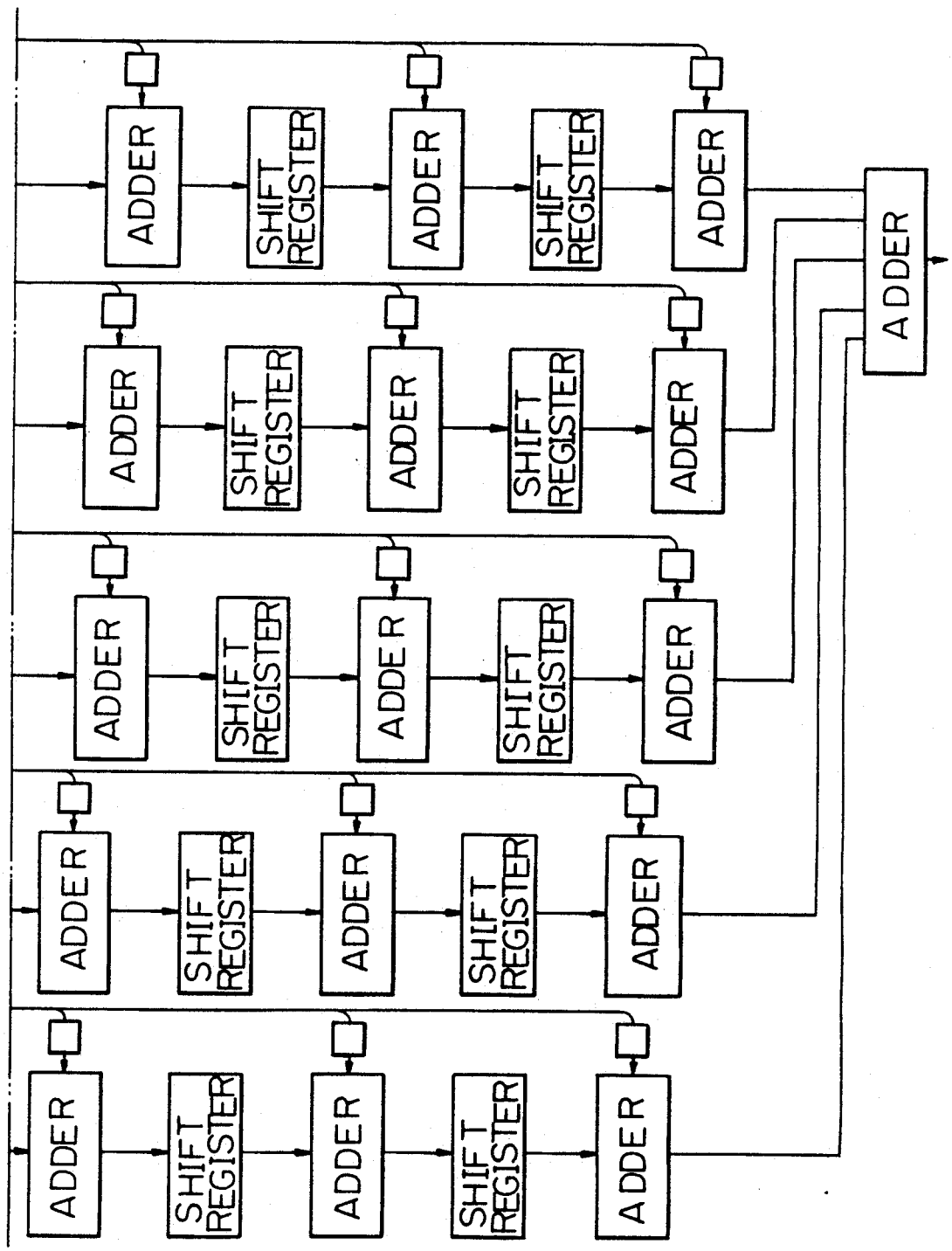
FIG. 18, consisting of FIGS. 18A and 18B is a detailed block diagram of another example of a linear differentiation circuit.

Although the circuit arrangement to calculate the linear differentiations as shown in *1 and *2 in Table 2 can be realized as shown in FIG. 18, its operation principle is substantially the same as that of FIG. 15. Therefore, a method of setting the coefficients of the multipliers is omitted.

Edge Emphasizer 5

Figure 19:
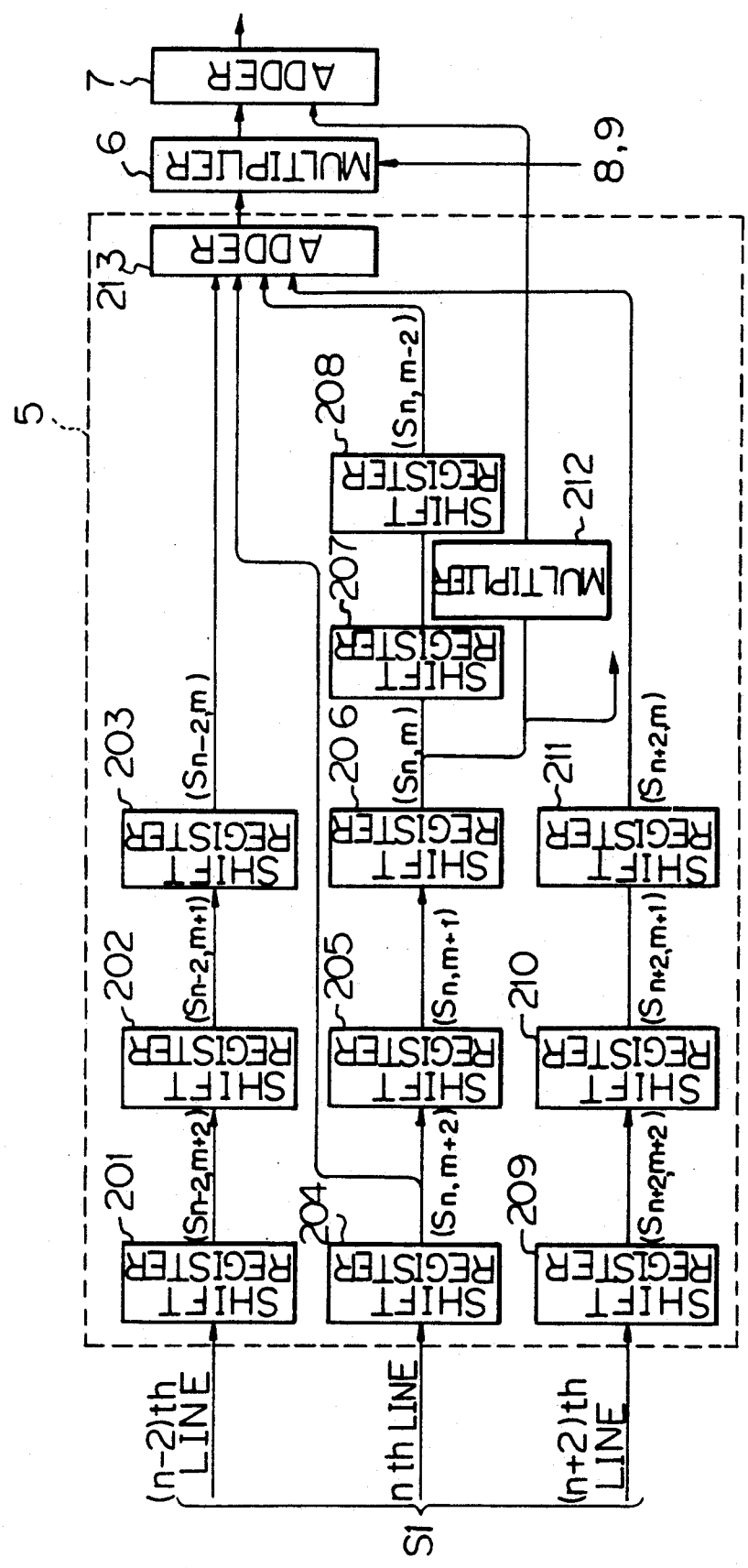
FIG. 19 is a detailed block diagram of the edge detector 5.

FIG. 19 shows the edge emphasizer 5.

As shown in FIG. 20, the input image signal $S_1$ shown in FIG. 7 consists of the data of five continuous lines of the image data. After the input image data inputted to the 5-line buffer 301 was stored in the five line buffers, the data as much as five lines is simultaneously outputted. This data is outputted one pixel by one synchronously with the image transfer clock (not shown) in the main scanning direction of the image data.

As shown in FIG. 21, the objective area S in the image area is further enlarged and the objective pixel data is set to $S_{n,m}$. In this case, the image data around this objective pixel data will now be considered. The image data as much as three lines of the (n−2)th, nth, and (n+2)th lines in the input image data $S_1$ is inputted to the edge emphasizer 5 in FIG. 19. The objective pixel to be image processed is set to $S_{n,m}$.

Figure 22:
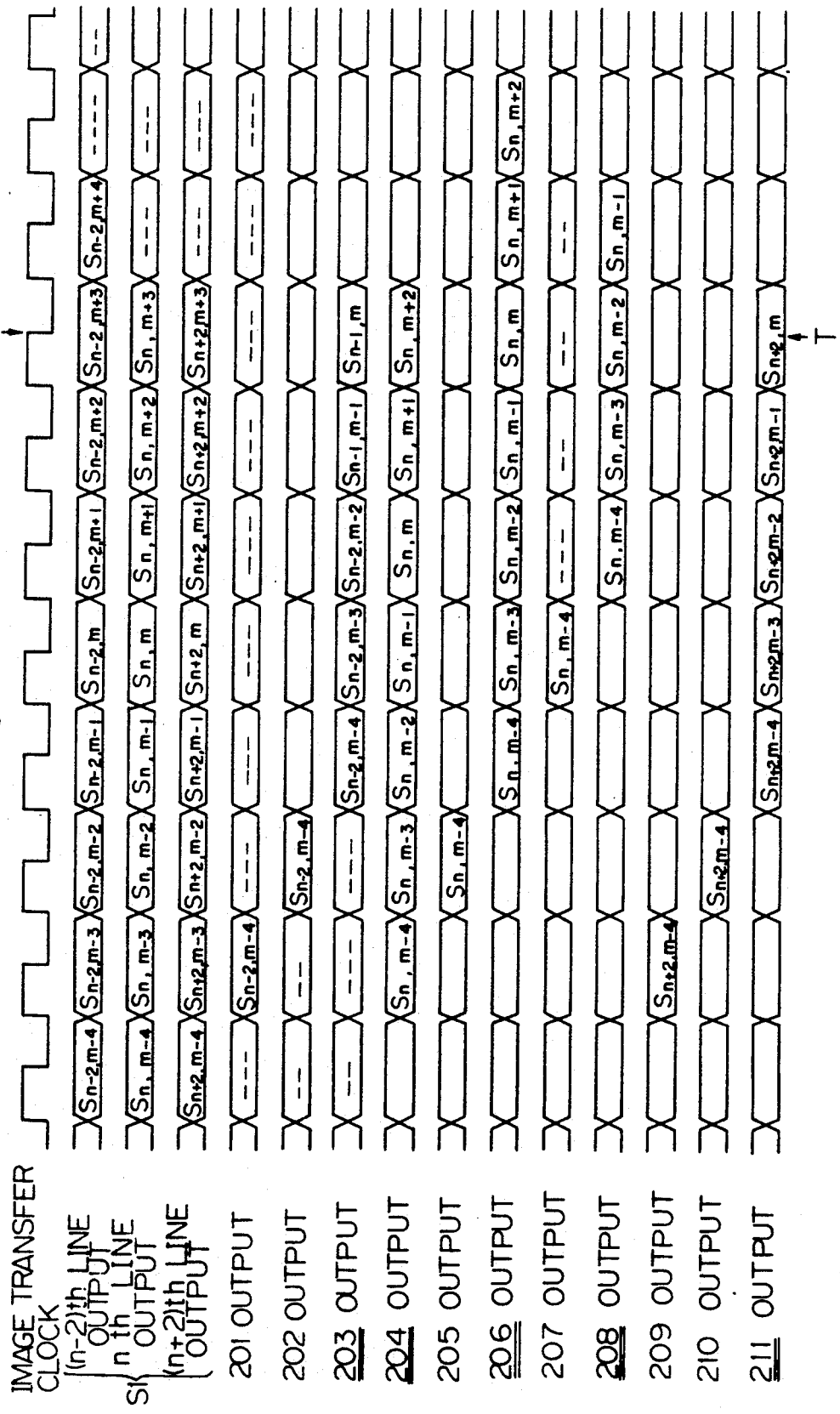
FIG. 22 is a diagram showing the operation of the edge detector 5.

In FIG. 19, reference numerals 201 to 211 denote one-bit shift registers. The image data $S_1$ is shifted by the shift registers 201 to 203, 204 to 208, and 209 to 211 synchronously with the image transfer clock (not shown). A timing chart in this case is shown in FIG. 22, in which outputs of the shift registers at a certain timing T are indicated (   ) in FIG. 19.

An adder 213 adds the output data $S_{n-2,m}$, $S_{n,m-2}$, $S_{n,m+2}$, and $S_{n+2,m}$ of the shift registers 203, 204, 208, and 211. The added data is multiplied with −1 by the multiplier 6. The image data of the objective pixel $S_{n,m}$ is outputted from the shift register 206 and multiplied with 4 by a multiplier 212 and added by the adder 7. Then, the adder 7 outputs the edge detection signal $G \cdot S_{11}$ as shown in expression (2) and FIG. 7.

Since the kernel elements of the (n−2)th line and the (n+2)th line are the same, the shift registers 209 to 211 may be omitted and after the outputs of the (n−2)th and (n+2) lines were added, the added output may be inputted to the shift register 201. It is obviously understood that the edge emphasizer 5 can be constituted by inputting the value of the kernel *4 to the multiplier using the circuit of FIG. 18.

Smoothing Processor 3

FIG. 23 shows a detailed diagram of the block of the smoothing processor 3 in FIG. 7.

The image signal $S_1$ consists of the data of five continuous lines in the subscanning direction of the image. An adder 271 adds the data of five pixels in the subscanning direction. An output data of the adder 271 is inputted to a shift register 272 to delay the data by one bit. An output data of the shift register 272 is inputted to adders 277 to 280. The adder 272 adds the output of the shift register 272 and the preceding data of one pixel before. The result of this addition is latched in a shift register 274 and then added to the data of the next pixel by the adder 278. In a manner similar to the above, at time $T_2$, as shown in FIG. 24, the data $S_{N,m+2}+S_{N,m+1}+S_{N,m}+S_{N,m-1}+S_{N,m-2}$ is outputted from the adder 280 (where, $S_{N,j}=S_{n-2,j}+S_{n-1,j}+S_{n,j}+S_{n+1,j}+S_{n+2,j}$).

Figure 26:
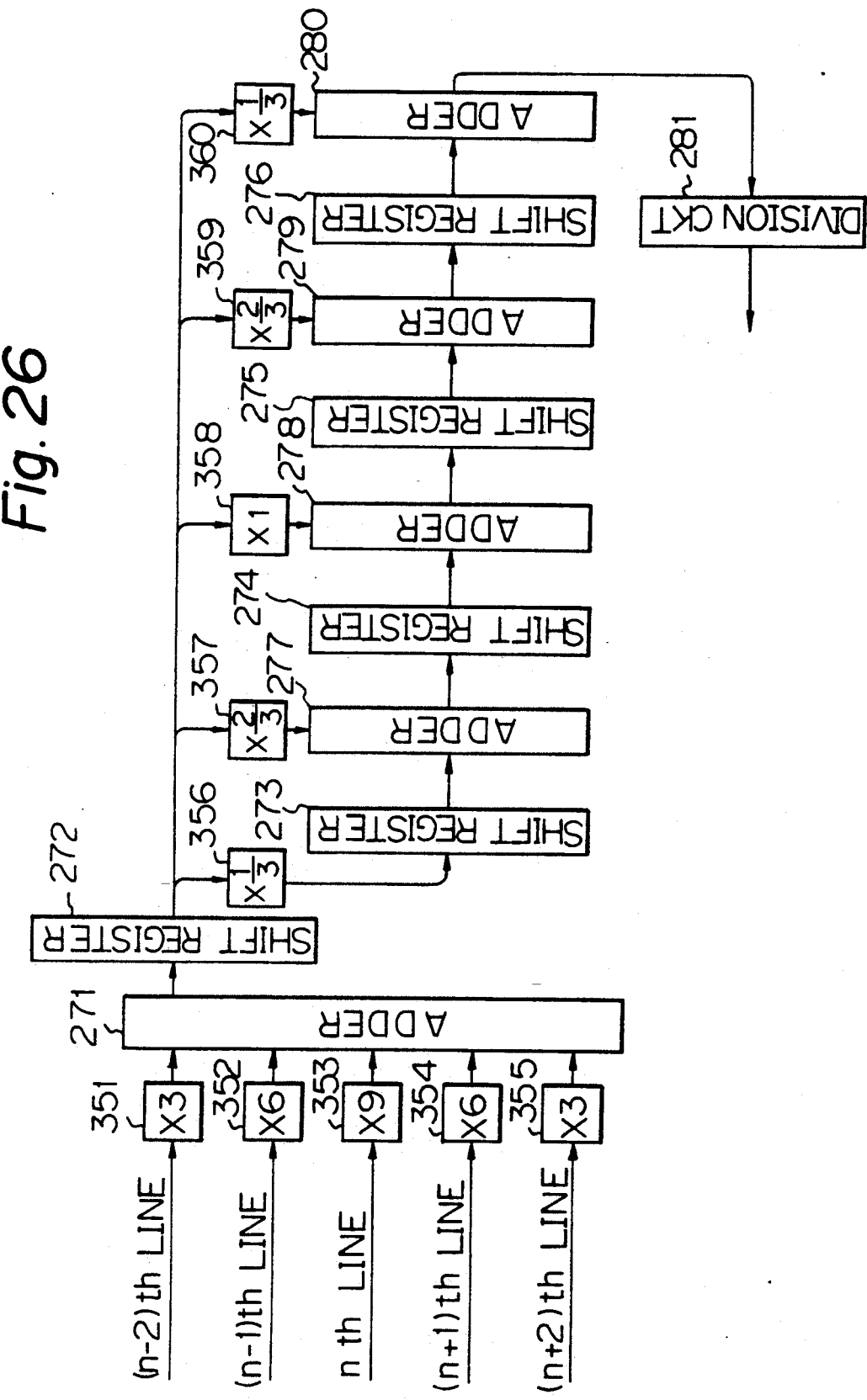
FIG. 26 is a block diagram for performing the smoothing process of FIG. 25.

In this way, when the objective pixel is $S_{n,m}$, the sum of the data of the pixels shown in *3 in expression (2) is outputted from the adder 280. This sum is divided by the total number of pixels by a division circuit 281, so that the smoothed data is derived. FIG. 26 shows a circuit to perform the smoothing process with weights as shown in FIG. 25. Although the operation timings and the like are substantially the same as those in FIG. 23, in the circuit arrangement of FIG. 26, respective lines are weighted by multipliers 351 to 355 and respective columns are also weighted by multipliers 356 to 360, thereby smoothing the data as shown in FIG. 25.

In this smoothing processor, after all added values in the subscanning direction of the image were added, the result of this addition is added to the data in the main scanning direction of the image, so that the circuit scale can be reduced.

Second Embodiment

Figure 33:
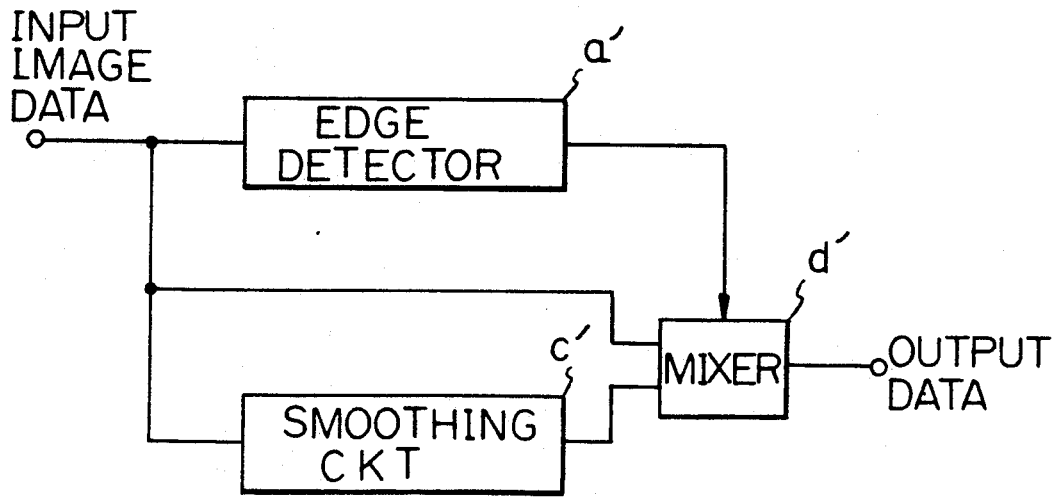
FIG. 33 is a fundamental block diagram of an image processing apparatus of the second embodiment.

The second embodiment is shown in FIG. 33 and the subsequent drawings.

FIG. 33 shows a fundamental constitution of an image processing apparatus of the second embodiment of the present invention. This image processing apparatus comprises an edge detector a', a smoothing circuit c', and a mixer d'. Similarly to the first embodiment, the edge detector a' has the spatial frequency characteristic such that the edges of the characters, line drawings, and images are detected and the meshes of the mesh image are not detected as the edges. The smoothing circuit c' smoothes the images. The mixer d' changes the mixture ratio of the input image and the smoothing image in accordance with a signal of the edge detector a'0 and outputs the data of the different mixture ratio. In this manner, the meshes of the mesh image are determined to be the non-edge area and the smoothing process is performed, thereby averaging them and preventing the moire. Further since the edge area and the non-edge area are continuously connected, the change of texture at the boundary is prevented.

Figure 34:
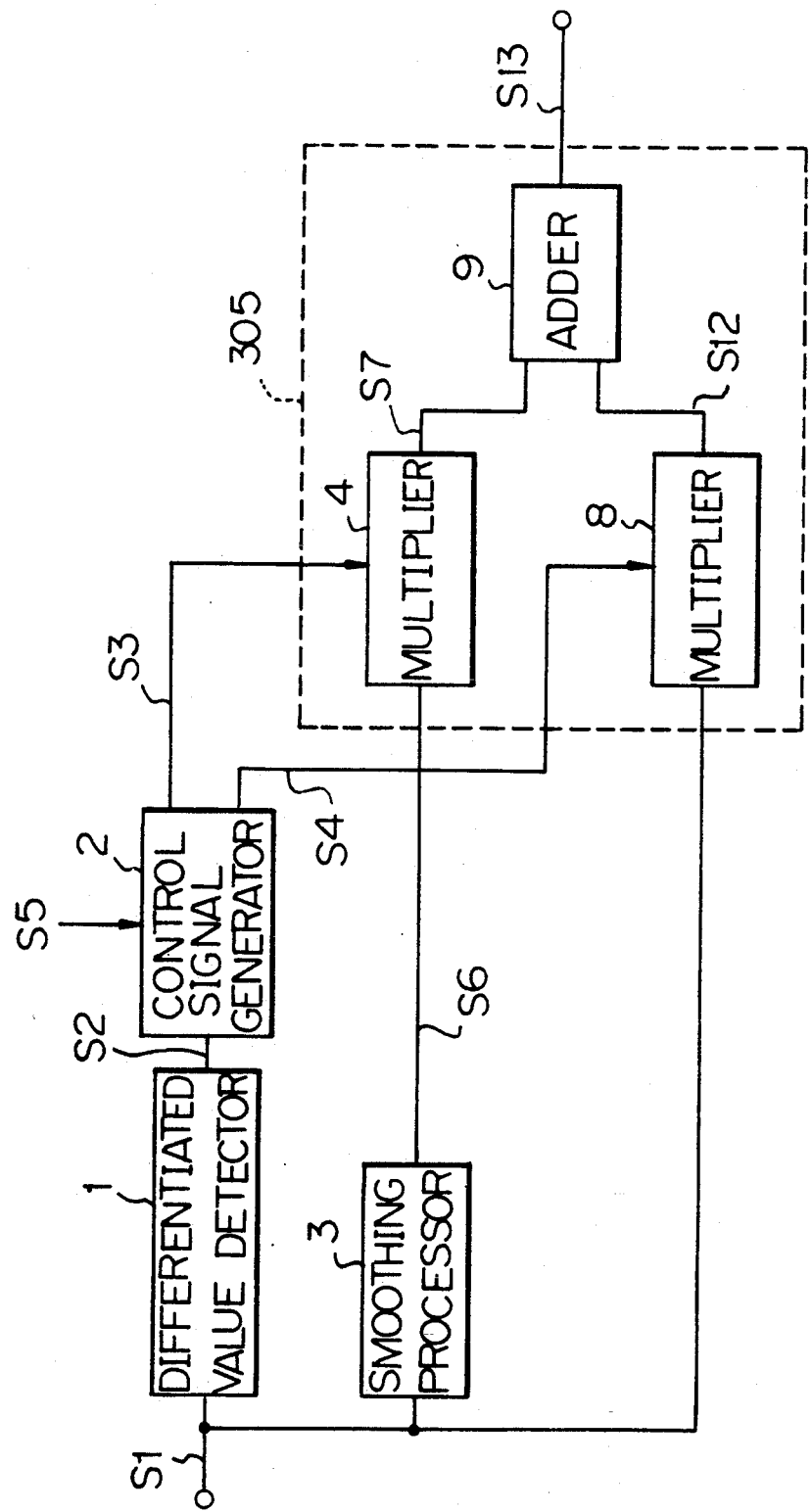
FIG. 34 is an image processing block diagram of the apparatus of FIG. 33.

FIG. 34 is a block diagram showing the second embodiment, in which the parts and components having the same functions as those shown in the embodiment of FIG. 7 are designated by the same refefence numerals. $S_1$ is the input image signal and 1 is the differentiated value detector to detect the absolute value of the linear differentiated value of the input image signal $S_1$ and corresponds to a' in FIG. 33. $S_2$ is the differentiation signal connected to the output of the detector 1; 2 is the control signal generator to produce the control signals $S_3$ and $S_4$ from the differentiation signal $S_2$; $S_3$ the control signal as the output of the control signal generator 2; $S_4$ the control signal which is also the output of the generator 2 and is complementary with the control signal $S_3$; and 3 the smoothing processor to smooth the input image signal $S_1$ and corresponds to c' in FIG. 33. $S_6$ is the smoothing image signal smoothed by the smoothing processor 3; 4 the multiplier to get the product of the smoothing image signal $S_6$ and the control signal $S_3$; $S_7$ the output of the multiplier 4; 8 the multiplier to get the product of the input image signal $S_1$ and the control signal $S_4$; $S_{12}$ the output of the multiplier 8; 9 the adder to get the sum of the outputs $S_7$ and $S_{12}$; and $S_{13}$ the processing image signal as the output of the adder 9. The multipliers 4 and 8 and adder 9 constitute the mixer d' in FIG. 33.

Figure 35:
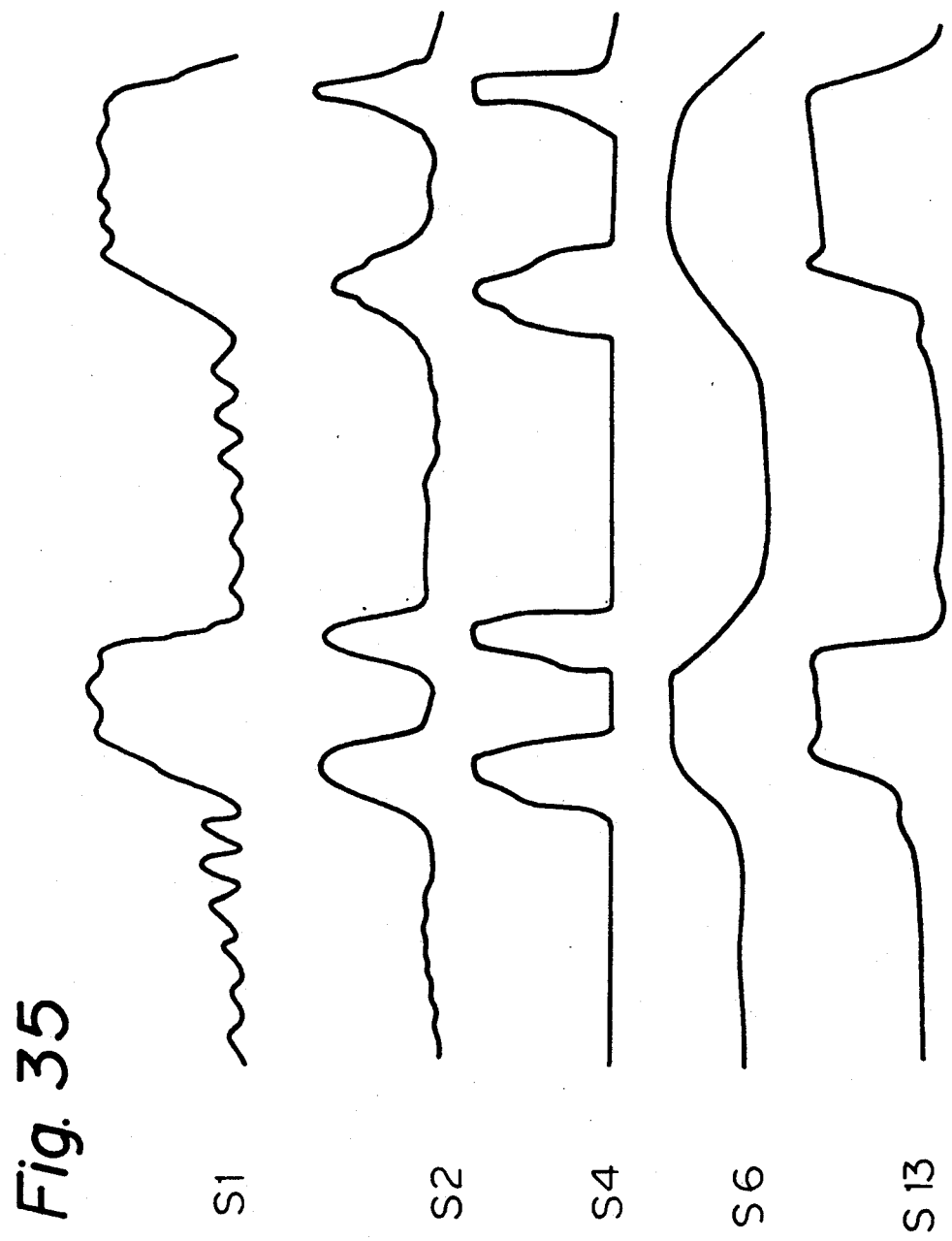
FIG. 35 is a signal waveform diagram of each section of FIG. 34.

The mixer 305 mixes the input image data and the output of the smoothing processor 3 at a proper mixture ratio. Either one of the control signals $S_3$ and $S_4$ is outputted in accordance with the output of the differentiated value detector 1 which is inputted to the control signal generator 2 at the front stage of the mixer 305. The control signals $S_3$ and $S_4$ are not necessarily limited to the complementary signals as will be explained hereinafter. The characteristics of the control signals $S_3$ and $S_4$ can be arbitrarily selected by the control signal $S_5$. The multiplier 8 multiplies the input image data on the basis of the control signal $S_4$. The multiplier 4 multiplies the output of the smoothing processor 3 on the basis of the control signal $S_3$. Both outputs of the multipliers 4 and 8 are added by the adder 9, so that the image processing output is derived from the adder 9. FIG. 35 shows signal waveforms of the respective sections in FIG. 34. The detailed circuits of the respective sections in FIG. 33 are similar to those in the first embodiment.

Other Embodiments

Each kernel of the differentiated value detector, smoothing processor, and edge emphasizer is set to 5×5 in the first and second embodiments. However, the kernel may be 3×3, in dependence on the number of lines for the purpose of the removal of the moire. Also, the kernel may be set to over 5×5 as necessary. There is no need to use kernels of the same size for the differentiated value detector and the smoothing processor in accordance with the purpose. Further, the kernels are not limited to square ones.

On one hand, in the first and second embodiments, a set of 5-line buffers was provided and the edge detection, smoothing process, and edge emphasis were executed by means of parallel processes. However, those processes are not necessarily executed in parallel.

In the illustrated embodiments, the smoothing signal $S_6$ as the output of the smoothing processor 3 and the edge emphasizing signal $S_{11}$ as the output of the adder 7 were added at the mixture ratio according to the output of the gamma converting circuit 2. However, the input image signal $S_1$ may be used in place of the edge emphasizing signal $S_{11}$. In this case, although this method is slightly inferior to the illustrated embodiments with respect to the characters and line drawings, the apparatus can be remarkably simplified and the same effect as in the embodiments can be obtained with regard to the suppression of the moire, so that this method is advantageous.

In addition, in the case where the edge emphasizer consisting of the edge emphasizer (or detector) 5, multiplier 6, and adder 7 shown in FIGS. 7 and 34 is constituted such that the central portion of the kernel *4 of the edge emphasizer 5 can be varied by the constant S$_9$, the multiplier 6 and adder 7 are unnecessary.

Further, although the constant S$_9$ can be varied from the outside in the embodiments, it may be a fixed value stored or otherwise retained in the apparatus.

The characteristic of the control signal generator 2 to perform the gamma conversion was as shown in FIG. 8 in the embodiments of the invention; however, the invention is not limited to this. For example, the characteristic of the gamma converting circuit 2 may be set to either of the modified forms as shown in FIGS. 27A, 27B, and 27C.

Figure 27A:
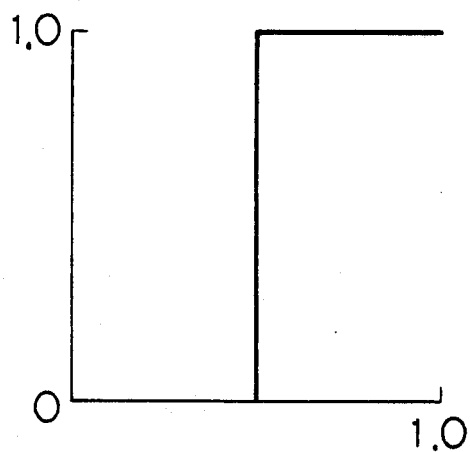
FIGS. 27A, 27B, and 27C are diagrams showing other gamma conversion characteristics of the control signal generator 2.
Figure 27B:
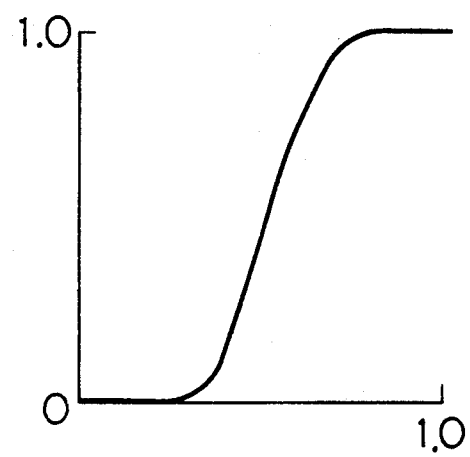
Figure 27C:
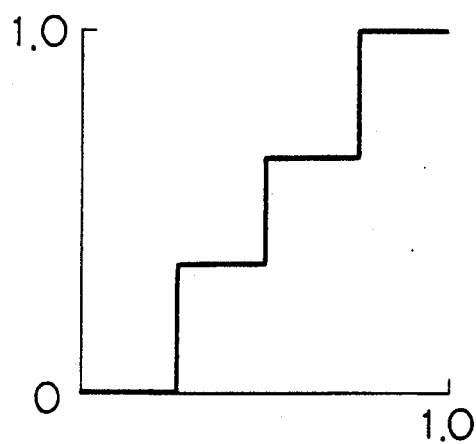

Although only the characteristic of the control signal S$_4$ was shown in FIGS. 27A to 27C, the control signal S$_3$ is expressed by $$S_3 = 1 - S_4$$

FIG. 27A shows the characteristic such as $$S_4 = 0 \text{ for } 0 < S_2 < 0.5$$

$$S_4 = 1.0 \text{ for } 0.5 < S_2 < 1.0$$

In particular, there is the feature such that the circuit of the gamma converting circuit can be easily constituted.

FIG. 27B shows the characteristic such as $$S_4 = -arctan\ (k \cdot S_2 + k)$$

Particularly, there is the feature such that the smoothing signal and the edge emphasizing signal are smoothly connected.

FIG. 27C shows the characteristic such as $$S_4 = 0 \text{ for } 0 < S_2 < 0.25$$

$$S_4 = 0.33 \text{ for } 0.25 < S_2 < 0.5$$

$$S_4 = 0.67 \text{ for } 0.5 < S_2 < 0.75$$

$$S_4 = 1.0 \text{ for } 0.75 < S_2 < 1.0$$

There are the features such that the circuit is relatively simplified for the embodiment shown in FIG. 8 and at the same time, the smoothing signal and the edge emphasizing signal can be more smoothly connected as compared with the case where the characteristic of the gamma converting circuit shown in FIG. 27A is used.

In more detail, for example, the well-known Prewit edge detecting method, Sorbel edge detecting method, or the like may be used for the differentiated value detector. Also, a Laplacian may be used for the edge detector. Further, although the spatial filter process is generally performed using the nucleus of 3×3 as the Prewit, Sorbel, or Laplacian edge detecting method, even if the size of nucleus is expanded to the size other than 3×3 as well, the essence of the invention is not influenced at all.

As described above, according to the present invention, the occurrence of the moire can be prevented in the case of reproducing the image including the mesh portion and at the same time, the characters and thin lines can be reproduced with a high degree of fidelity due to the edge emphasis.

In addition, by detecting the differentiated value of the image using the edge detecting means, the flat mesh portion can be separated from the image, so that the mesh portion can be smoothed and the moire due to the meshes and dither pattern can be suppressed.

Also, since the characters and thin lines are not smoothed, the original image can be reproduced with a high degree of fidelity.

Moreover, the non-mesh image such as a photograph image is not influenced.

Further, by non-linearly converting the output of the edge detecting means, the edge detecting component which is produced due to dirt contaminating the image can be removed.

According to the invention, the edge detecting means, edge emphasizing means, and smoothing means are operated in parallel, so that the image can be processed at a high speed.

By non-linearly converting the output of the edge detecting means, on one hand, the edge detection component which is produced due to dirt contaminating the image can be removed.

According to the invention, the edge detecting means, smoothing means, edge emphasizing means are operated by way of the convoluting method and at the same time, the sizes of nuclei necessary for the respective convolutions are equal. Thus, the number of necessary line buffers can be equalized and the same line buffer can be used, so that the circuit scale can be reduced.

According to the invention, in addition, the second peak level of the frequency characteristic of the linear differentiation for the edge detection is set to be ⅔ of the first peak level, so that even when the nucleus of the kernel is reduced, the edge can be easily detected. Therefore, the number of line buffers can be decreased and the edges can be detected at a high speed by a circuit of a small scale.

As described above, according to the invention, the image of a high quality can be obtained at a high speed by a simple circuit.

The present invention is not limited to the foregoing embodiments but many modifications and variations are possible within the spirit and scope of the appended claims of the invention.

What is claimed is:

1. An image processing apparatus comprising:
   detecting means for detecting a level of a predetermined spatial frequency, said predetermined spatial frequency corresponding to portions in an image signal which portions have a feature selected from the group consisting of character and line drawing, said detecting means outputting a detection signal corresponding to the level of said predetermined spatial frequency;
   smoothing means for smoothing said image signal to produce a smoothed image signal; and
   mixing means for mixing said smoothed image signal and said image signal,
   wherein a mixture ratio of said mixing means is varied in response to said detection signal, and a component of said smoothed image signal becomes larger when said detection signal becomes smaller, and
   wherein said mixture ratio is determined by an output of a continuous function using the level detected by said detecting means as a variable.

2. An image processing apparatus according to claim 1, wherein said detecting means consists of a linear differential circuit.

3. An image processing apparatus according to claim 2, wherein said detecting means obtains the sum of linear differentiations in two or more directions.

4. An image processing apparatus comprising:
   detecting means for detecting a level of a predetermined spatial frequency, said predetermined spatial frequency corresponding to portions in an image signal which portions have a feature selected from the group consisting of character and line drawing, said detecting means outputting a detection signal corresponding to the level of said predetermined spatial frequency;
   smoothing means for smoothing said image signal to produce a smoothed image signal;
   edge emphasizing means for edge-emphasizing said image signal to produce an edge-emphasized image signal; and
   mixing means for mixing said smoothed image signal and said edge-emphasized image signal,
   wherein a mixture ratio of said smoothed image signal and said edge-emphasized image signal is controlled in response to said detection signal, and a component of said smoothed image signal becomes larger when said detection signal becomes smaller, and
   wherein said mixture ratio is determined by an output of a continuous function using the level detected by said detecting means as a variable.

5. An image processing apparatus according to claim 4, wherein said detecting means performs the detection by way of a linear differentiation.

6. An image processing apparatus according to claim 5, wherein said detecting means performs the detection based on a sum of linear differentiations in two or more directions.

7. An image processing apparatus according to claim 4, wherein said edge emphasizing means is a spatial filter having a high band emphasizing characteristic.

8. An image processing apparatus according to claim 4, wherein said edge-emphasized image signal is a sum of said image signal and an output obtained by multiplying an output of a spatial filter having a high-pass characteristic by a constant.

9. An image processing apparatus according to claim 4, wherein said edge-emphasized image signal is a sum of said image signal and an output obtained by multiplying an output of a spatial filter having a band-pass characteristic by a constant.

10. An image processing apparatus according to claim 4, wherein said edge emphasizing means has a spatial filter, and a peak frequency of said spatial filter is higher than said predetermined spatial frequency detected by said detecting means.

11. An image processing apparatus comprising:
    detecting means for detecting a level of a predetermined spatial frequency, said predetermined spatial frequency corresponding to portions in an image signal which portions have a feature selected from the group consisting of character and line drawing, said detecting means outputting a detection signal corresponding to the level of said predetermined spatial frequency;
    a smoothing circuit for smoothing said image signal to produce a smoothed image signal;
    mixing means for mixing said image signal and said smoothed image signal; and
    converting means for non-linearly converting said detection signal to produce a converted detection signal,
    wherein a mixture ratio of said mixing means is varied in response to said converted detection signal, and a component of said smoothed image signal becomes larger when said detection signal becomes smaller, and
    wherein said mixture ratio is determined by an output of a continuous function using the level detected by said detecting means as a variable.

12. An image processing apparatus comprising:
    detecting means for detecting a level of a predetermined spatial frequency, said predetermined spatial frequency corresponding to portions in an image signal which portions have a feature selected from the group consisting of character and line drawing, said detecting means outputting a detection signal corresponding to the level of said predetermined spatial frequency;
    a smoothing circuit for smoothing said image signal to produce a smoothed image signal;
    an edge emphasizing circuit for emphasizing the edges of said image signal to produce an edge-emphasized image signal; and
    converting means for non-linearly converting said detection signal to produce a converted detection signal,
    wherein said smoothed image signal and said edge-emphasized image signal are mixed, in a mixture ratio controlled in response to said detection signal, and said smoothed image circuit becomes larger when said detection signal become smaller, and
    wherein said mixture ratio is determined by an output of a continuous function using the level detected by said detecting means as a variable.

13. An image processing apparatus comprising:
    edge detecting means for detecting an edge portion of an image signal and outputting a detection signal;
    a smoothing circuit for smoothing said image signal to produce a smoothed image signal;
    an edge emphasizing circuit for emphasizing edges in said image signal to produce an edge-emphasized image signal; and
    means for mixing said smoothed image signal and said edge-emphasized image signal to produce a mixed signal or selecting said smoothed image signal in response to the detection signal and then outputting said mixed signal or selected signal,
    wherein said edge emphasizing circuit comprises a spatial filter having a peak frequency higher than a peak frequency of said edge detecting means.

14. An image processing apparatus comprising:
    edge detecting means for detecting an edge portion of an image signal and outputting a detection signal;
    a smoothing circuit for smoothing said image signal to produce a smoothed image signal;
    an edge emphasizing circuit for emphasizing edges in said image signal to produce an edge-emphasized image signal; and
    means for mixing said smoothed image signal said edge-emphasized image signal to produce a mixed signal or selecting said smoothed image signal in response to the detection signal and then outputting said mixed signal or selected output,
    wherein said edge detecting means comprises a spatial filter having a peak frequency lower than a primary harmonic frequency of a mesh image.

15. An image processing apparatus comprising:
edge detecting means for detecting an edge portion of an image signal to produce a detection signal;
a smoothing circuit for smoothing said image signal to produce a smoothed image signal;
an edge emphasizing circuit for emphasizing edges in said image signal to produce an edge-emphasized image signal; and
means for mixing said smoothed image signal and said edge-emphasized image signal to produce a mixed signal or selecting said smoothed image signal or said edge-emphasized image signal in response to the detection signal and then outputting said mixed signal or selected output,
wherein said smoothing circuit comprises a spatial filter having a peak frequency characteristic near a primary harmonic frequency of a mesh image is sufficiently reduced.

16. An image processing method comprising the steps of:
detecting a level of a predetermined spatial frequency corresponding to portions of character and line drawing in an input image signal, and outputting a detection signal corresponding to the level of the predetermined spatial frequency;
smoothing said image signal to produce a smoothed image signal;
mixing said image signal and the smoothed image signal to produce a mixed signal or selecting said image signal or the smoothed image signal and then outputting said mixed signal or the selected signal; and
controlling a ratio of said mixture and said selection in response to the detection signal output in said detecting step,
wherein a rate of a smoothed output in said smoothing step becomes larger when the detection signal becomes smaller, and
wherein said ratio is determined by an output of a continuous function using the level detected in said detecting step as a variable.

17. An image processing method comprising the steps of:
detecting a level of a predetermined spatial frequency corresponding to portions of character and line drawing in an input image signal and outputting a detection signal corresponding to the level of the predetermined spatial frequency;
smoothing the image signal to produce a smoothed image signal;
emphasizing the edge of the image signal to produce an edge-emphasized image signal;
mixing the edge-emphasized image signal and the smoothed image signal to produce a mixed signal or selecting the edge-emphasized image signal or the smoothed image signal and then outputting the mixed signal or selected signal; and
controlling a ratio of said mixture and said selection in response to the detection signal output in said detecting step,
wherein an amount of a smoothed signal in said ratio becomes larger when the detection signal becomes smaller, and
wherein said ratio is determined by a continuous function using the level detected in said detecting step as a variable.

18. An image signal processing apparatus comprising:
input means for inputting an image signal;
detection means for detecting a predetermined spatial frequency from the image signal to extract a character and line-drawing region, the predetermined spatial frequency corresponding to a character and a line drawing, said detection means producing a detection signal;
smooth means for smoothing the image signal to produce a smoothed image signal; and
edge emphasis means for edge-emphasizing the image signal to produce an edge-emphasized image signal,
wherein said edge emphasis means is enabled in response to the detection signal, and
wherein said smooth means is enabled with respect to lower and higher regions which regions are not detected by said detection means, said lower region representing a frequency region the frequency of which is lower than said predetermined spatial frequency, and said higher region representing a frequency region the frequency of which is higher than said predetermined spatial frequency.

19. An image signal processing apparatus according to claim 18, wherein a peak frequency of the detected spatial frequency of said detection means is lower than a peak frequency of said edge emphasis means.

20. An image signal processing apparatus according to claim 18, wherein said detection means consists of a linear differentiation circuit.

21. An image signal processing apparatus according to claim 20, wherein said detection means obtains the sum of linear differentiations in two or more directions.

22. An image signal processing apparatus according to claim 20, wherein a second peak of a frequency characteristic of said liner differentiation is set to be ⅔ of a first peak.

23. An image signal processing apparatus according to claim 18, further comprising combine means for combining said smoothed image signal and said edge-emphasized image signal with each other.

24. An image signal processing apparatus according to claim 23, wherein said combine means selects one of said smoothed image signal and said edge-emphasized image signal, responsive to the detection signal.

25. An image signal processing apparatus according to claim 23, wherein said combine means mixes said smoothed image signal and said edge-emphasized image signal to produce a mixed output, changing a mixing ratio of said smoothed image signal and said edge-emphasized image signal responsive to the detection signal.

26. An image signal processing apparatus according to claim 25, further comprising conversions means for non-linearly converting the output of said detection means.

27. An image signal processing apparatus according to claim 18, wherein said edge emphasis means has a spatial filter different from said detection means.

28. An image signal processing apparatus according to claim 18, wherein the detected peak frequency of said detection means is set to be lower than a primary harmonic frequency of mesh image.

29. An image signal processing apparatus according to claim 28, wherein the primary harmonic frequency is smoothed by said smooth means, to be eliminated.

30. An image signal processing apparatus according to claim 18, wherein said detection means, smooth means and edge emphasis means operate in parallel.

31. An image signal processing apparatus according to claim 18, wherein said detection means, smooth means and edge emphasis means operate by way of a convoluting method, and the sizes of nuclei necessary for the respective convolutions are equalized.

32. An image signal processing apparatus comprising:
receiving means for receiving a signal representing an image;
detection means for detecting a spatial frequency in the image represented by the received signal;
smoothing means for smoothing the received image signal to produce a smoothed image signal;
edge-emphasis means for edge-emphasizing the received image signal to produce an edge-emphasized image signal; and
forming means responsive to said detection means for forming an output signal at least predominantly from the edge-emphasized image signal for regions in the image having a spatial frequency within a predetermined frequency range and at least predominantly from the smoothed image signal for regions in the image having a spatial frequency outside the predetermined frequency range.

33. An apparatus according to claim 32, wherein said detection means produces an output having a peak at a peak frequency within the predetermined frequency range, the peak frequency being lower than a peak frequency of said edge-emphasis means.

34. An image signal processing apparatus comprising:
input means for inputting an image signal;
detector means for detecting a predetermined local frequency range of the image signal corresponding to a character and a line drawing range for extracting the character and line drawing range;
smoothing means for smoothing the image signal to produce a smoothed image signal; and
edge-emphasis means for edge-emphasizing the image signal to produce an edge-emphasized image signal,
wherein said edge-emphasis means is activated in the predetermined local frequency range in dependence on a detection result obtained by said detector means,
wherein said smoothing means is active as a low-pass filter in at least a frequency range which is other than the predetermined local frequency range in dependence on the detection range of said detector means, and
wherein said edge-emphasized image signal and said smoothed image signal are mixed in a mixer in a suitable ratio.

35. An apparatus according to claim 34, wherein a peak frequency of the detected local frequency of said detector means is lower than a peak frequency of said edge-emphasis means.

36. An image processing apparatus comprising:
detecting means for detecting a level of feature of an input image signal;
first processing means for processing the image signal;
second processing means for processing the image signal, characteristics of said second processing means being different from characteristics of said first processing means; and
mixing means for mixing an output of said first processing means and an output of said second processing means at a predetermined ratio,
wherein said ratio is defined by an output of a continuous function using the level detected by said detecting means as a variable.

37. An apparatus according to claim 36, wherein the continuous function si a linear function.

38. An apparatus according to claim 36, wherein the feature is an edge component of the input image signal.

39. An apparatus according to claim 36, wherein said second processing means is delay means.

* * * * *

UNITED STATES PATENT AND TRADEMARK OFFICE
CERTIFICATE OF CORRECTION

PATENT NO. : 5,231,677
DATED : July 27, 1993
INVENTOR(S) : YOSHINOBU MITA, ET AL.

It is certified that error appears in the above-identified patent and that said Letters Patent is hereby corrected as shown below:

Title page,
IN [56] REFERENCES CITED

Under U.S. PATENT DOCUMENTS, "Liad" should read --Liao--.

Under OTHER PUBLICATIONS, "Verabeitung" should read --Verarbeitung-- and "Bilverbesserung" should read --Bildverbesserung--.

COLUMN 1

Line 11, "image" should read --an image--.
    Line 52, "$f_s(=1/P_s)[PEL/mm]]-$" should read --$f_s(=1/P_s)[PEL/mm]$--.
    Line 62, "$F_D=1/P_D[PEL/mm]$" should read --$f_D=1/P_D[PEL/mm]$--.

COLUMN 3

Line 7, "image" should read --an image--.
    Line 28, "diagrams" should read --diagram--.
    Line 45, "15B" should read --15B,--.
    Line 46, "circuite" should read --circuits--.
    Line 51, "18B" should read --18B,--.

COLUMN 4

LIne 36, "adjusted" should read --adjusted,--.

COLUMN 7

Line 39, "signal S $_3$" should read --signal $S_3$--.
    Line 59, "(1);" should read --(1)--.

UNITED STATES PATENT AND TRADEMARK OFFICE
CERTIFICATE OF CORRECTION

PATENT NO. : 5,231,677
DATED : July 27, 1993
INVENTOR(S) : YOSHINOBU MITA, ET AL.

It is certified that error appears in the above-identified patent and that said Letters Patent is hereby corrected as shown below:

COLUMN 8

Line 11, "normalize" should read --to normalize--.

COLUMN 9

Line 28, "dimension" should read --dimension,--.

COLUMN 10

Line 9, "singal" should read --signal--.
    Line 34, "mountains" should read --peaks--.
    Line 37, "$S_{11}$" should read --$S_{11}.$--.

COLUMN 11

Line 20, "30" should read --+--.

COLUMN 12

Line 64, "(n+2)" should read --(n+2)th--.

COLUMN 13

Line 11, "adder 272" should read --adder 271--.
    Line 33, "were" should read --are--.
    Line 52, "detector a'0" should read --detector a'--.

COLUMN 18

Line 61, "signal" should read --signal and--.

UNITED STATES PATENT AND TRADEMARK OFFICE
CERTIFICATE OF CORRECTION

PATENT NO. : 5,231,677
DATED : July 27, 1993
INVENTOR(S) : YOSHINOBU MITA, ET AL.

It is certified that error appears in the above-identified patent and that said Letters Patent is hereby corrected as shown below:

COLUMN 20

Line 52, "conversions" should read --conversion--.
    Line 62, "mesh" should read --a mesh--.

COLUMN 22

Line 21, "feature" should read --a feature--.
    Line 36, "si" should read --is--.

Signed and Sealed this

Third Day of January, 1995

Attest:

BRUCE LEHMAN

*Attesting Officer*      *Commissioner of Patents and Trademarks*